United States Patent
Miura et al.

(10) Patent No.: US 7,543,450 B2
(45) Date of Patent: Jun. 9, 2009

(54) AIR INTAKE STRUCTURE FOR SMALL WATERCRAFT

(75) Inventors: Takayoshi Miura, Saitama (JP); Masatsugu Matsumoto, Tokyo (JP); Yosuke Hoi, Saitama (JP); Yoshitaka Hayama, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/709,174

(22) Filed: Feb. 22, 2007

(65) Prior Publication Data

US 2007/0199321 A1 Aug. 30, 2007

(30) Foreign Application Priority Data

| Feb. 24, 2006 | (JP) | ............................ | 2006-049277 |
| May 29, 2006 | (JP) | ............................ | 2006-148608 |
| May 30, 2006 | (JP) | ............................ | 2006-149473 |

(51) Int. Cl.
  F02B 29/04 (2006.01)

(52) U.S. Cl. ........................... 60/599; 60/597; 60/605.1
(58) Field of Classification Search ................. None
See application file for complete search history.

(56) References Cited

U.S. PATENT DOCUMENTS

| 7,168,998 B1 * | 1/2007 | Jones et al. | ............... 440/88 A |
| 2005/0172919 A1 * | 8/2005 | Ozaki et al. | ............. 123/65 BA |
| 2007/0059997 A1 * | 3/2007 | Mineo | ...................... 440/88 A |

FOREIGN PATENT DOCUMENTS

| JP | 2003-27915 A | 1/2003 |
| JP | 2004-116478 A | 4/2004 |

* cited by examiner

*Primary Examiner*—Thomas Denion
*Assistant Examiner*—Douglas J. Duff
(74) *Attorney, Agent, or Firm*—Birch, Stewart, Kolasch & Birch, LLP

(57) ABSTRACT

An air intake structure for a small watercraft for ensuring the capacity of an inter-cooler and for connecting the inter-cooler to a supercharger by a simply shaped communicating portion. In an air intake structure for a small watercraft, an intake passage and an exhaust passage can be disposed on the left side and the right side, respectively, of a plurality of cylinders. A turbocharger is disposed rearwardly of the engine with the turbocharger is connected to an intake passage via an inter-cooler. In addition, the inter-cooler is disposed rearwardly of the engine, with the distribution passage being disposed forwardly of and on the left side of the inter-cooler so as to extend in the forward and rearward direction. The inter-cooler is connected to the rear end of the distribution passage with an intake pipe contiguous to cylinders being bent rearwardly along a side surface of the engine body.

20 Claims, 20 Drawing Sheets

AIR INTAKE STRUCTURE FOR SMALL WATERCRAFT

CROSS-REFERENCE TO RELATED APPLICATIONS

The present application claims priority under 35 USC 119 to Japanese Patent Application Nos. 2006-049277 filed on Feb. 24, 2006; 2006-148608 filed on May 29, 2006 and 2006-149473 filed on May 30, 2006 the entire contents of which are hereby incorporated by reference.

BACKGROUND OF THE INVENTION

1. Field of the Invention

The present invention relates to an air intake structure for a small watercraft in which a supercharger is provided rearward of an engine so as to communicate with an intake passage via an inter-cooler. In addition, the present invention relates to a supercharger-equipped internal combustion engine for a personal watercraft.

2. Description of Background Art

Examples of an air intake structure for a small watercraft include one wherein a turbocharger (supercharger) is provided rearward of an engine and an inter-cooler is located on the side of the engine so as to communicate with the turbocharger via a communication pipe. See, JP 2004-116478.

In an air intake structure for a small watercraft, air sucked in an air cleaner is directed to the turbocharger. The air directed in the turbocharger is then directed to the inter-cooler via the communication pipe.

Thereafter, the air directed in the inter-cooler is directed to an air box via a throttle valve and then the air directed in the air box is directed in a cylinder.

The conventional air intake structure for a small watercraft includes an air box disposed on the upside of the inter-cooler. The inter-cooler and the air box are relatively largely shaped members.

In addition, it is necessary to ensure a space for disposing a cooling water hose for water-cooling and another space for arranging control harnesses around the inter-cooler.

It is difficult, therefore, to provide a relatively large shaped inter-cooler for providing an increase in capacity.

In addition, the conventional small air intake structure is such that the air outlet of a turbocharger faces upward and the air inlet of the inter-cooler faces rearwardly.

Accordingly, in order to cause the air outlet of the turbocharger to communicate with the air inlet of the inter-cooler via a communication pipe, the communication pipe needs to be bent in a complicated shape. This construction does not permit a reduction in the cost.

Commonly assigned JP 2003-27915 discloses a supercharger-equipped internal combustion engine for a personal watercraft.

The internal combustion engine for a personal watercraft disclosed in JP 2003-27915 is mounted such that a crankshaft extends in the forward and rearward direction of a watercraft body. A turbocharger or supercharger is disposed rearwardly of the engine.

In addition, a surge tank provided and projects on the side surface of the engine on the port side so as to communicate with intake ports of cylinder heads. An inter-cooler is disposed below the surge tank.

Thus, the turbocharger disposed rearwardly of the engine is spaced apart from the inter-cooler disposed on the left side of the engine, so that a long connection pipe is used to connect the turbocharger with the inter-cooler.

Such a long connection pipe interposed between the turbocharger and the inter-cooler may damage an air intake flow in a greater or less degree.

In addition, since the inter-cooler projects on the port side of a lower half portion of the engine, it is difficult to form an open space on the watercraft body.

Further, a pipe is lengthened which is adapted to introduce cooling water to the inter-cooler from the jet propulsion pipe disposed at the rear portion of the watercraft body.

SUMMARY AND OBJECTS OF THE INVENTION

It is an object of the present invention to provide an air intake structure for a small watercraft in which the capacity of an inter-cooler can be ensured with ease and the inter-cooler can communicate with a supercharger via a simply shaped communicating portion.

According to an embodiment of the present invention, an air intake structure for a small watercraft includes an engine mounted on a watercraft body so that a plurality of cylinders are arranged in a row in a back-and-forth direction of the watercraft body. The air intake structure includes an intake passage disposed on one side, of left and right sides, of the cylinders so as to communicate with the cylinders with an exhaust passage disposed on the other side of the cylinders so as to communicate with the cylinders. A supercharger is disposed rearwardly of the engine so as to communicate with the intake passage via the inter-cooler. The inter-cooler is disposed rearwardly of the engine with a distribution passage communicating with the intake passage being disposed forward of the inter-cooler and on the one side of the cylinders so as to extend in the back-and-forth direction of the watercraft body. In addition, the inter-cooler communicates with a rear end of the distribution passage.

According to an embodiment of the present invention, the supercharger is a turbocharger that communicates with the exhaust passage and is driven by exhaust gas directed from the engine through the exhaust passage.

According to an embodiment of the present invention, the rear end of the distribution passage communicates with the inter-cooler via a distribution passage communicating portion and the distribution passage communicating portion is provided with a throttle valve.

According to an embodiment of the present invention, the inter-cooler is disposed close to the one side of the cylinders and the turbocharger is disposed close to the other side.

The distribution passage is disposed on one side of the cylinders and the exhaust passage is disposed on the other side of the cylinders.

Thus, according to an embodiment of the present invention, the inter-cooler is disposed close to the one side of the cylinders and the turbocharger is disposed close to the other side of the cylinders.

According to an embodiment of the present invention, since the inter-cooler is disposed rearwardly of the engine, the inter-cooler can be spaced apart from the intake passage and the distribution passage with both having a relatively large shape. In addition, rear of the engine can easily be ensured with a relatively wide space.

Thus, a space adapted to dispose a cooling water hose for water-cooling and a space adapted to extend a control harness can be easily ensured around the inter-cooler.

This makes it easy to relatively enlarge the shape of the inter-cooler, thereby easily ensuring the capacity of the inter-cooler.

Since the inter-cooler is disposed rearwardly of the engine, the inter-cooler can be disposed close to the supercharger.

This provides an advantage of simply configuring the inter-cooler connecting portion which connects the inter-cooler with the supercharger.

In addition, according to an embodiment of the present invention, the distribution passage is disposed forward of the inter-cooler so as to extend in the back-and-forth direction of the watercraft body. This makes it possible for the rear end portion of the distribution passage to face the inter-cooler.

The communication of the inter-cooler with the rear end of the distribution passage provides an advantage of making it possible to simply configure the distribution passage connecting portion adapted to connect the inter-cooler to the rear end of the distribution passage.

According to an embodiment of the present invention, the turbocharger driven by exhaust gas directed from the engine through the exhaust passage is used as a supercharger disposed rearwardly of the engine.

The exhaust gas of the engine is usually directed to the rear of the engine by means of the exhaust structure (exhaust system) extending from the exhaust passage to the rear of the watercraft body.

Thus, since the turbocharger is disposed rearward of the engine, the turbocharger can be connected to the exhaust passage using the exhaust structure.

This provides an advantage of making it possible to easily configure the communication portion adapted to connect the turbocharger to the exhaust passage.

According to an embodiment of the present invention, the rear end of the distribution passage is connected to the inter-cooler by means of the distribution passage communicating portion and the distribution passage communicating portion is equipped with the throttle valve.

The inter-cooler is disposed rearward of the engine and the distribution passage is provided to extend in the back-and-forth direction of the watercraft body. Thus, the rear end of the distribution passage is disposed on the rear side of the engine. Since the rear end of the distribution passage is connected to the inter-cooler disposed rearward of the engine by means of the distribution passage communicating portion, the distribution passage communicating portion is located rearwardly of the engine.

Since provided in the distribution passage communicating portion, the throttle valve can be disposed on the rear side of the engine.

Since the rear side of the engine can ensure a relatively wide space, the throttle valve can face the wide space.

This provides an advantage wherein the throttle valve can be maintained and checked using the relatively wide space on the rear side of the engine, thereby improving maintenance performance.

According to an embodiment of the present invention, since the inter-cooler is disposed close to one side of the cylinders, the inter-cooler can be put closer to the distribution passage.

Thus, the distribution passage communicating portion adapted to connect the inter-cooler to the distribution passage can be reduced in length.

Since disposed close to the other side of the cylinders, the turbocharger can be put closer to the exhaust passage.

Thus, the communicating portion adapted to connect the turbocharger to the exhaust passage can be reduced in length.

As described above, the distribution passage communicating portion adapted to connect the inter-cooler to the distribution passage and the communicating portion adapted to connect the turbocharger to the exhaust passage can be reduced in length. This provides an advantage in assembling the air intake structure for a small watercraft into a compact layout.

In addition, it is an object of an embodiment of the present invention to provide an internal combustion engine for a personal watercraft that is capable of reducing piping and the like to smooth an air intake flow from a supercharger and for facilitating the formation of an open space on a watercraft body.

To achieve the object of an embodiment of the present invention, an internal combustion engine with a supercharger for a personal watercraft is mounted in a watercraft body defined by a hull and a deck so as to direct a crankshaft in the forward and rearward direction of the watercraft body and for driving a jet propulsion pump. The internal combustion engine includes an inter-cooler disposed rearwardly of an engine body with an intake pipe being contiguous to cylinders of the engine, bending rearwardly of and along a side surface of the engine body and connected to a throttle body. The throttle body extends around the rear of the engine body and is connected to the inter-cooler.

According to an embodiment of the present invention, the supercharger is disposed rearwardly of the engine body and directly below the inter-cooler.

According to an embodiment of the present invention, the intake pipe contiguous to the cylinders bends rearwardly along the side surface of the engine body and is connected to the throttle body. The throttle body extends around the rear of the engine body and is connected to the inter-cooler. Thus, the intake route is smoothly bent, thereby smoothing an air intake flow from the inter-cooler.

The inter-cooler, the throttle body and the intake pipe are collectively arranged from the rear surface of and along the left side surface of the engine body. In addition, the throttle body is arranged to extend around the rear of the engine body. This reduces the lateral width of the rear of the engine, thereby making the entire engine compact. Thus, a wider open space can be created in the watercraft body.

The throttle body can be directly connected to the inter-cooler, thereby reducing piping and the like.

According to an embodiment of the present invention, the supercharger is disposed rearwardly of the engine body and directly below the inter-cooler. Therefore, an air intake distance extending from the turbocharger through the inter-cooler to the intake pipe is minimized, which significantly reduces piping and the like to minimize air intake resistance, thereby improving air intake efficiency.

To achieve the object according to an embodiment of the present invention an internal combustion engine for a personal watercraft is provided which is a multi-cylinder internal combustion engine with a supercharger mounted in a watercraft body. The watercraft body includes a hull and a deck wherein a crankshaft of the engine is positioned in a forward and rearward direction of the watercraft body for driving a jet propulsion pump. The internal combustion engine includes the supercharger disposed rearwardly of the engine body with an inter-cooler disposed above the supercharger to cool intake air pressurized by the supercharger.

According to an embodiment of the present invention, the internal combustion engine for a personal watercraft includes an intake manifold into which intake pipes contiguous to cylinders of the internal combustion engine are assembled and bent rearwardly along a side surface of the engine body. The intake manifold is connected to a throttle body, and the throttle body is connected to the inter-cooler disposed above the supercharger.

According to an embodiment of the present invention, the internal combustion engine for a personal watercraft includes the intake manifold that is bent such that a watercraft's side external edge of the intake manifold comes closer to the center of the engine body as the watercraft's side external edge goes to an rear end of the watercraft's side external edge.

According to an embodiment of the present invention the internal combustion engine for a personal watercraft includes the supercharger disposed rearwardly of the engine body and an inter-cooler disposed above the supercharger so as to cool intake air pressurized by the supercharger. Therefore, the supercharger and the inter-cooler are directly connected to each other to eliminate piping such as a hose and the like.

The inter-cooler can be provided to the rear of the engine body which has a relatively wide space; therefore, a space can be created on the side of the engine body, which facilitates intake and exhaust piping.

In addition, only a short pipe is needed to introduce cooling water into the inter-cooler from the jet propulsion pump disposed in the rear portion of the watercraft body.

According to an embodiment of the present invention, the internal combustion engine for a personal watercraft includes an intake manifold into which intake pipes contiguous to cylinders of the internal combustion engine are assembled and bent rearwardly along a side surface of the engine body and is connected to a throttle body, and the throttle body is connected to the inter-cooler disposed above the supercharger. Therefore, the throttle body is brought close to and can be directly connected to the inter-cooler, which eliminates piping such as a hose and the like.

An air intake distance is minimized which extends from the supercharger through the inter-cooler to the intake pipe, whereby air intake resistance can be minimized to improve air intake efficiency.

According to an embodiment of the present invention, the internal combustion engine for a personal watercraft includes the intake manifold that is bent such that a watercraft's side external edge of the intake manifold comes closer to the center of the engine body as it goes to a rear end of the watercraft's side external edge. Therefore, the air intake route bends smoothly, which smoothes an air intake flow from the inter-cooler and can reduce the air intake distance.

In addition, since respective spaces on both sides of the rear end portions of the internal combustion engine become wider, a narrow engine compartment can be effectively utilized.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Preferred embodiments of the present invention will be hereunder described with reference to the accompanying drawings. Note that the terms "front," "rear," "left" and "right" denote the direction viewed from an operator and the symbols Fr, Rr, L and R denotes the front, the rear or back, the left and the right, respectively.

Figure 1:
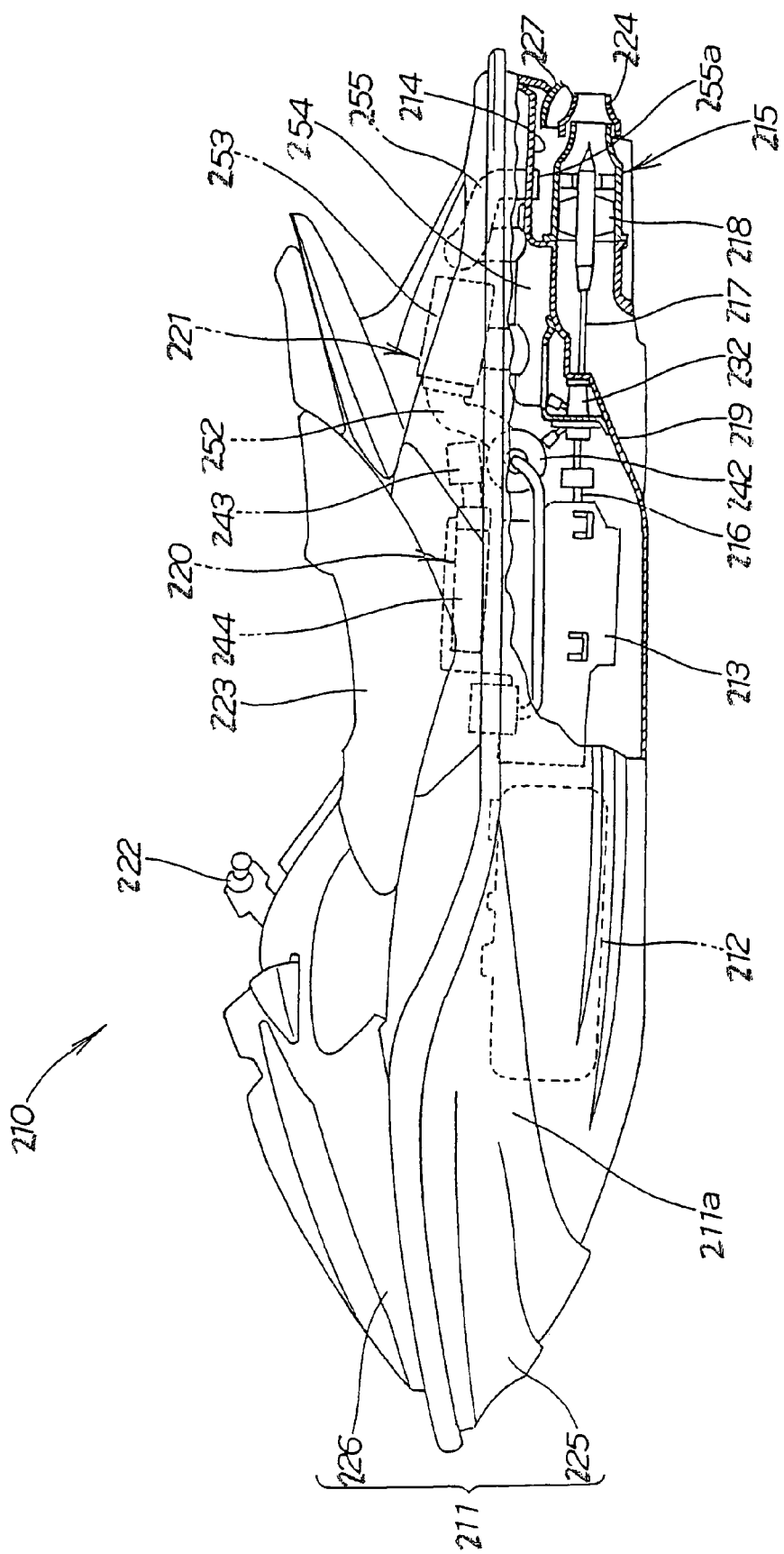
FIG. 1 is a side view of a small watercraft according to the present invention.

FIG. 1 is a side view of a small watercraft according to the present invention.

The small watercraft 210 is a water-jet propelling boat that includes a fuel tank 212 disposed at a front portion 211a of a watercraft body 211 with an engine 213 disposed rearwardly of the fuel tank 212. A pump chamber 214 is disposed rearwardly of the engine 213 with a water-jet pump 215 placed in the pump chamber 214. A drive shaft 217 is adapted to connect the water-jet pump to an output shaft 216 of the engine 213. In addition, the water-jet propelling boat includes an air intake structure (air intake structure for a small watercraft) adapted to supply air to the engine 213 with an exhaust structure 221 adapted to discharge exhaust gas from the engine 213. A steering handlebar 222 is disposed above the fuel tank 212. A seat 223 is disposed rearwardly of the steering handlebar 222.

The watercraft body 211 is configured such that a hull 225 constituting the lower portion of the watercraft body 211 is covered by and joined to a deck 226 constituting the upper portion of the watercraft body 211.

With the small watercraft 210, the engine 213 is driven to rotate the drive shaft 217, thereby rotating an impeller 218, which is built in the water-jet pump 215.

Rotating the impeller 218 takes in water from a suction opening 219 of the bottom of the watercraft and the water taken in is ejected rearwardly of the watercraft body 211 from a steering nozzle 224 through the inside of the water-jet pump 215.

Thus, the watercraft 210 is propelled (glides) forwardly.

On the other hand, when the watercraft 210 is moved rearwardly, a reverse bucket 227 disposed above the steering nozzle 224 is shifted to a reverse position located rearward of the steering nozzle 224.

Thus, the water ejected rearward from the steering nozzle 224 is directed to the front of the watercraft body 211, whereby the ejected water thus directed moves the watercraft 10 backwards.

Figure 2:
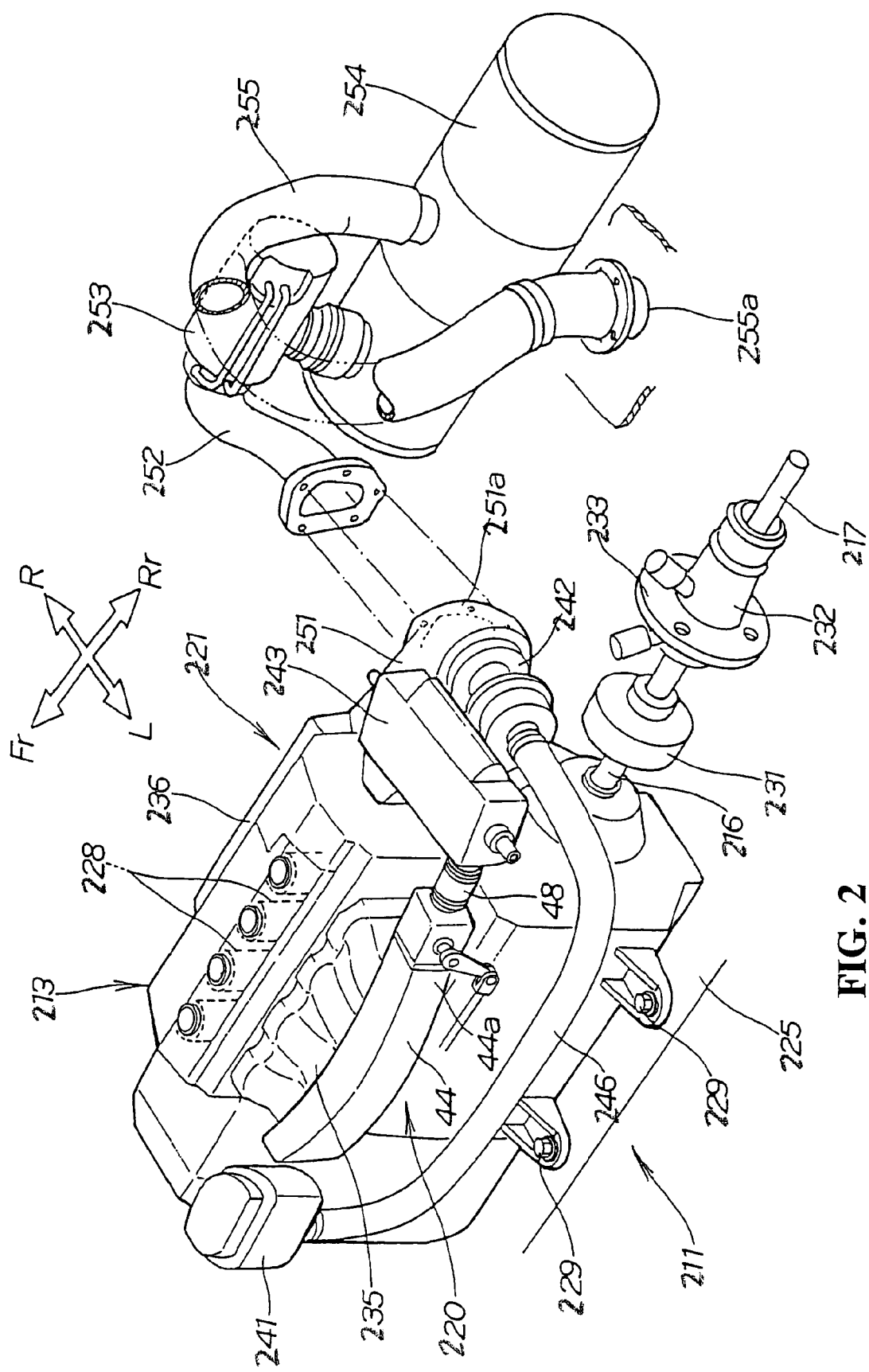
FIG. 2 is a perspective view illustrating the inside of the small watercraft according to the invention.

FIG. 2 is a perspective view illustrating the inside of the watercraft according to the present invention.

The engine 213 includes a plurality of cylinders 228 arranged in the back-and-forth direction of the watercraft body 211 and left-hand and right-hand mount portions fastened to the hull 225 with bolts 229. In short, the engine 213 is longitudinally mounted on the watercraft body 211.

The output shaft 216 projects from the rear lower end of the engine 213 toward the back of the watercraft body 211. The drive shaft 217 is coupled to the output shaft 216 via a connection coupler 231.

The drive shaft 217 is rotatably journaled by a bearing portion 232 and is coupled at its rear end to the water-jet pump 215 (see FIG. 1).

A flange portion 233 provided on the bearing portion 232 is fastened to the hull 225 with bolts and nuts.

Since the engine 213 is mounted longitudinally with respect to the watercraft body 211, an intake passage 235 is disposed on the left side (one side) of the plurality of cylinders 228 and an exhaust passage 236 is disposed on the right side (the other side) of the cylinders 228.

The intake passage 235 constitutes e.g. an intake manifold and the exhaust passage 236 constitutes e.g. an exhaust manifold.

The intake passage 235 is a member constituting part of the intake structure 220 that communicates with the cylinders 228.

The exhaust passage 236 is a member constituting part of the exhaust structure 221 and that communicates with the cylinders 228.

The air intake structure 220 includes an air cleaner 241, a turbocharger (supercharger) 242, an inter-cooler 243, a distribution passage 244 and the intake passage 235.

The air cleaner 241 communicates with the turbocharger 242 via an air introduction pipe 246. The turbocharger 242 communicates with the inter-cooler 243, which in turn communicates with the distribution passage 244 via a distribution passage communicating portion 248. The distribution passage 244 communicates with an intake port of the intake passage 235.

The exhaust structure 221 includes an exhaust passage 236, a first exhaust pipe 251, a second exhaust pipe 252, an exhaust body 253, a water muffler 254 and an exhaust hose 255.

The first exhaust pipe 251 is provided to extend from the rear end portion of the exhaust passage 236 toward the rear of the watercraft body. A rear end portion 251a of the first exhaust pipe 251 communicates with the second exhaust pipe 252 and also with the turbocharger 242.

The second exhaust pipe 252 communicates with the exhaust body 253, which in turn communicates with the water muffler 254. The water muffler 254 communicates with the exhaust hose 255. A discharge port 255a of the exhaust hose 255 faces the inside of the pump chamber 214 (see FIG. 1).

Figure 3:
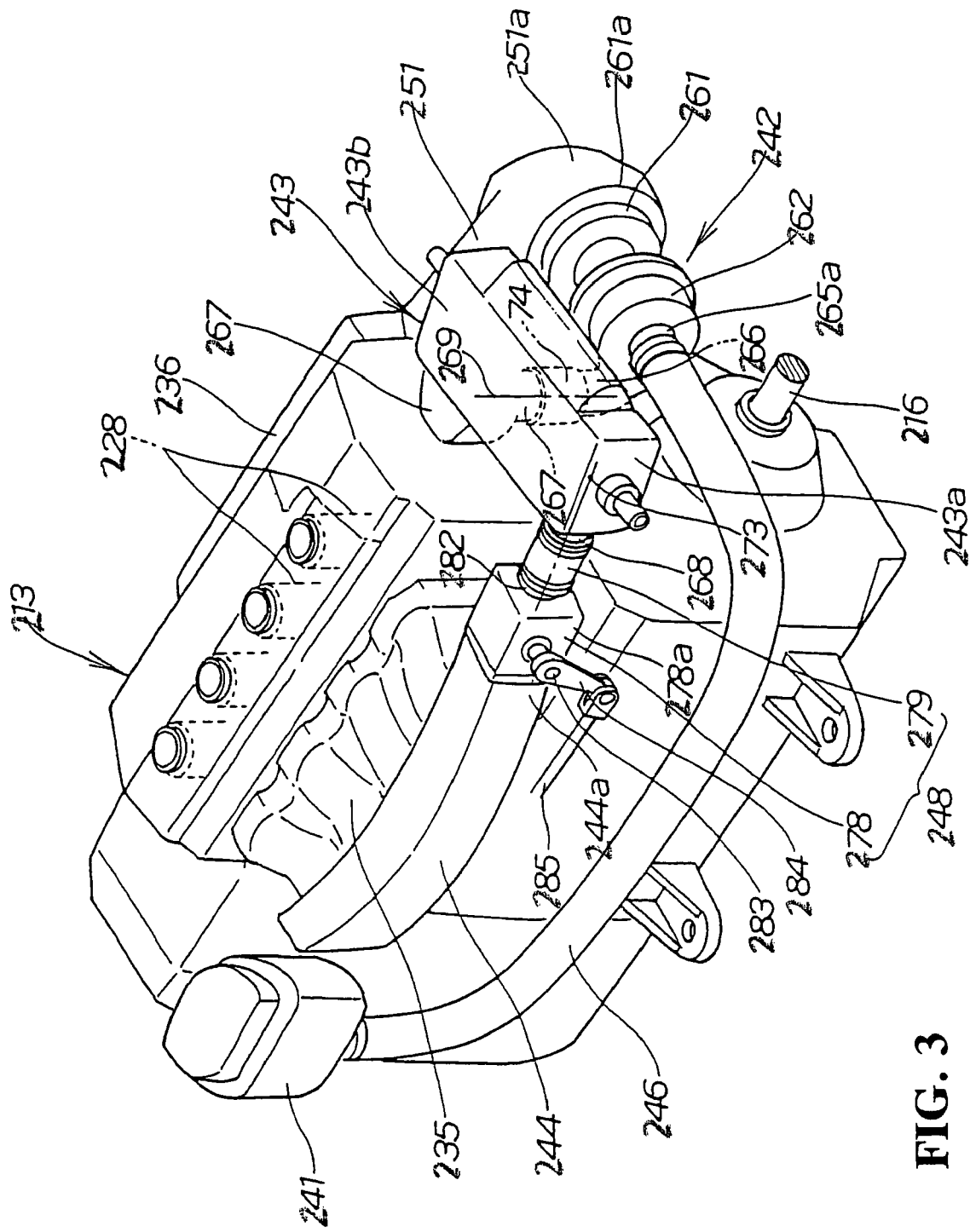
FIG. 3 is a perspective view of an air intake structure of the small watercraft according to the invention.
Figure 4:
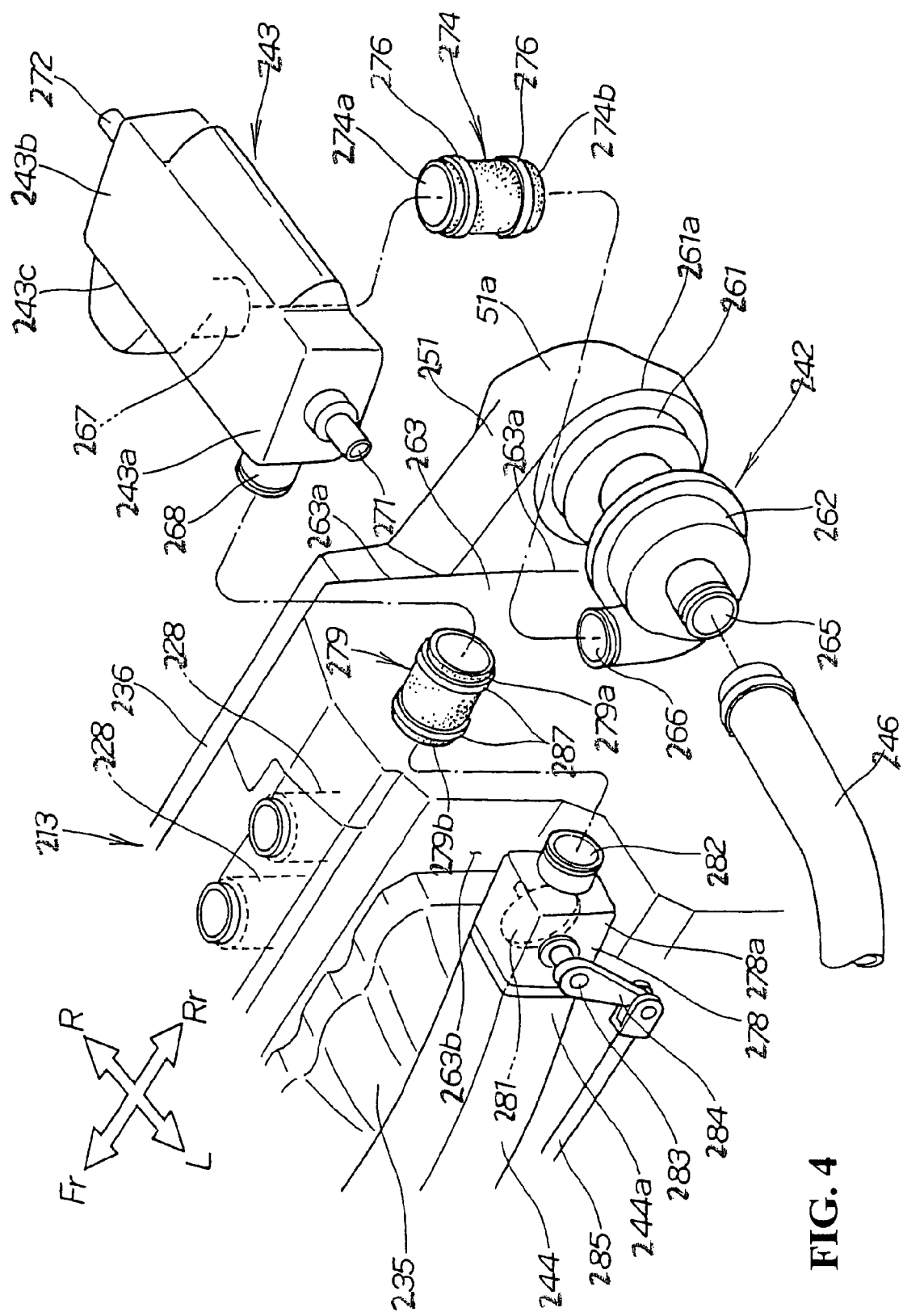
FIG. 4 is an exploded view of the air intake structure of the small watercraft.

FIG. 3 is a perspective view illustrating the air intake structure for a small watercraft and FIG. 4 is an exploded perspective view of the air intake structure for a small watercraft according to the present invention.

The air cleaner 241 is disposed forward of and on the left side of the engine 213 and communicates with the turbocharger 242 via the air introduction pipe 246.

The turbocharger 242 is disposed rearwardly of the engine 213 and above the output shaft 216. Further, the turbocharger 242 is disposed close to and on the right side of the cylinders 228 (i.e., on the right side of the engine 213) in transverse placement.

The transverse placement refers to a state in which the turbocharger is placed in a widthwise direction of the watercraft body 211.

Since the turbocharger 42 is placed transversely, a turbine casing 261 is disposed close to the right side portion 263a of a cylinder block 263 and a compressor casing 262 is disposed rearwardly of the cylinders 228 (i.e., at a position corresponding to the approximate center of the engine 213).

The compressor casing 262 includes an air inlet 265 for introducing air disposed to face to the left and an air outlet 266 for discharging air disposed to face upwardly.

The air inlet 265 communicates with the air cleaner 241 via the air introduction pipe 246.

Since the turbine casing 261 is disposed close to the right side portion 263a of the cylinder block 263, an end face 261a of the turbine casing 261 can be brought close to the right side portion 263a.

The end face 261a of the turbine casing 261 that is brought close to the right side portion 263a of the cylinder block 263 is joined to the rear end portion 251a of the first exhaust pipe 251. Thus, the turbine casing 261 communicates with the first exhaust pipe 251.

The turbocharger 242 is such that the turbine casing 261 communicates with the exhaust passage 236 via the first exhaust pipe 251.

This means that the turbocharger 242 is a supercharger driven by the exhaust gas directed from the engine 213 via the exhaust passage 236.

The use of the turbocharger 242 as a supercharger disposed rearwardly of the engine can permit the turbocharger 242 to communicate with the exhaust passage 236 by using the first exhaust pipe 251. The first exhaust pipe 251 is a member constituting part of the exhaust structure 221.

In this way, the turbocharger 242 can be made to communicate with the exhaust passage 236 by using the member constituting part of the exhaust structure 221. Therefore, a communicating portion adapted to permit the turbocharger 242 to communicate with the exhaust passage 236 can be simply configured.

The inter-cooler 243 is disposed above the turbocharger 242 and rearwardly of the engine 213. The inter-cooler 243 is a box-like-formed member, which is transversely disposed close to the left side of the cylinders 228 (i.e., the left side of the engine 213).

Thus, a left end portion 243a of the inter-cooler 243 is disposed close to the left side portion 263b of the cylinder block 263 and a right end portion 243b of the inter-cooler 243 is disposed rearwardly of the cylinders 228 (at a position corresponding to the approximate center of the engine 213).

The inter-cooler 243 includes an air inlet 267 for introducing air which is disposed on a front wall portion 243c on the side of the right end portion 243b so as to face downwardly. In addition, the inter-cooler 243 includes an air outlet 268 for discharging air which is disposed on the front wall portion 243c on the side of the left end portion 243a so as to face to the front.

Further, the inter-cooler 243 includes a fluid or water inlet 271 for introducing cooling fluid or water which is disposed on the left end portion 243a and a fluid or water outlet 272 for discharging cooled fluid or water which is disposed on the right end portion 243b.

Since the right end portion 243b of the inter-cooler 243 is disposed to the rear of the cylinders 228 (i.e., at a position corresponding to the approximate center of the engine 213), the air inlet 267 is positioned above the air outlet 266 of the compressor casing 262.

The air inlet 267 of the inter-cooler 243 is arranged to face downwardly, whereas the air outlet 266 of the compressor casing 262 is arranged to face upwardly.

Thus, it is possible to arrange the air inlet 267 of the inter-cooler 243 at a position near the air outlet 266 of the compressor casing 262 and on a coaxial line 269 so as to face the air outlet 266.

In this way, the air inlet 267 of the inter-cooler 243 is connected to the air outlet 266 of the compressor casing 262 through a relatively short, approximately straight inter-cooler communicating hose (inter-cooler communicating portion) 274.

The inter-cooler communicating hose 274 is such that its upper end portion 274a is fastened to the air inlet 267 with a fastening band 276 and its lower end portion 274b is fastened to the air outlet 266 with a fastening band 276.

Thus, the inter-cooler 243 is made to communicate with the turbocharger 242.

The distribution passage 244 is disposed forward of the left end portion 243a of the inter-cooler 243 and on the side of an intake port of the intake passage 235.

The distribution passage 244 is disposed to extend in the back-and-forth direction of the watercraft body 211 and communicates with the intake port of the intake passage 235.

Thus, the rear end portion 244a of the distribution passage 244 can be disposed at a position near the air outlet 268 of the inter-cooler 243 so as to face the air outlet 268 approximately coaxially therewith.

In this way, the rear end portion 244a of the distribution passage 244 can be connected to the air outlet 268 of the inter-cooler 243 through a relatively short, approximately straight distribution passage communicating portion 248.

The distribution passage communicating portion 248 is connected to the intake port of the intake passage 235 via the distribution passage 244. Thus, the intake passage 235 is connected to the turbocharger 242 through the distribution passage communicating portion 248 and the inter-cooler 243.

As described above, since being disposed close to the left side of the cylinders 228, the inter-cooler 243 can be brought close to the distribution passage 244.

Therefore, the distribution passage communicating portion 248 adapted to connect the inter-cooler 243 with the distribution passage 244 can be reduced in length.

Further, since being disposed close to the right side of the cylinders 228, the turbocharger 242 can be brought close to the exhaust passage 236.

Therefore, the first exhaust pipe (i.e., the communicating portion) 251 adapted to connect the turbocharger 242 with the exhaust passage 236 can be reduced in length.

As described above, the inter-cooler 243 can be adapted to reduce the length of the distribution passage communicating portion 248 communicating with the distribution passage 244 and that of the first exhaust pipe (i.e., the communicating portion) 251 adapted to connect the turbocharger 242 with the exhaust passage 236. Therefore, the intake structure 220 of the small watercraft can be assembled into a compact layout.

The distribution passage communicating portion 248 includes a valve housing passage 278 and a communication hose 279. The valve housing passage 278 extends rearwardly from the rear end 244a of the distribution passage 244. The communication hose 79 extends rearwardly from the rear end portion 78a of the valve housing passage 278 to the air outlet 268 of the inter-cooler 243.

The valve housing passage 278 houses a throttle valve 281 therein and is formed with an air inlet 282 adapted to introduce air.

A valve shaft 283 of a throttle valve 281 projects from a sidewall portion of the valve housing passage 278 and is coupled to a lever 284. The end of the lever 284 is coupled to the leading end of the operating cable 285, whose base is coupled to a throttle lever (not shown).

The throttle lever is attached to the steering handlebar 222 (see FIG. 1). Thus, a hand gripping the steering handlebar 222 can operate the throttle lever, thereby adjusting an opening angle of the throttle valve 281.

Since housed in the valve housing passage 278, the throttle valve 281 can be disposed on the rear side of the engine 213.

Since the rear side of the engine 213 ensures a relatively wide space, it is possible for the throttle valve 281 to face the relatively wide space.

Therefore, the throttle valve 281 can be maintained and checked by using the relatively wide space on the rear side of the engine 213.

The air inlet 282 of the valve housing passage 278 can be disposed at a position near the air outlet of the inter-cooler 243 and on a coaxial line 273 so as to face the air outlet 268.

Thus, the air inlet 282 of the valve housing passage 278 is connected to the air outlet 268 of the inter-cooler 243 through the relatively short, approximately straight communication hose 279.

The communication hose 279 is such that its rear end portion 279a is fastened to the air outlet 268 with a fastening band 287 and its front end portion 279b is fastened to the air inlet 282 with a fastening band 287.

With the air intake structure 220 for a small watercraft described above, since the inter-cooler 243 is disposed rearwardly of the engine 213, the inter-cooler 243 can be spaced apart from the intake passage 235 and the distribution passage 244 both having a relatively large shape. In addition, the rear of the engine 213 can easily ensure a relatively large space.

Thus, a space adapted to dispose a cooling water hose for water-cooling and a space adapted to arrange a control harness can be easily ensured around the inter-cooler 243.

This facilitates to relatively enlarge the shape of the inter-cooler 243, that is, to ensure the capacity of the inter-cooler.

Since disposed rearwardly of the engine 213, the inter-cooler 243 can be disposed near the turbocharger 242.

This makes it possible to simply configure the inter-cooler communicating hose 274 adapted to connect the inter-cooler 243 with the turbocharger 242.

Additionally, the distribution passage 244 is disposed forward of the inter-cooler 43 so as to extend in the back-and-forth direction of the watercraft body 211. This makes it possible to cause the rear end portion 44a of the distribution passage 244 to face the inter-cooler 243.

Since the inter-cooler 243 is connected to the rear end portion 244a, it is possible to simply configure the distribution passage communicating portion 248 adapted to connect the inter-cooler 243 with the rear end portion 244a.

Figure 5:
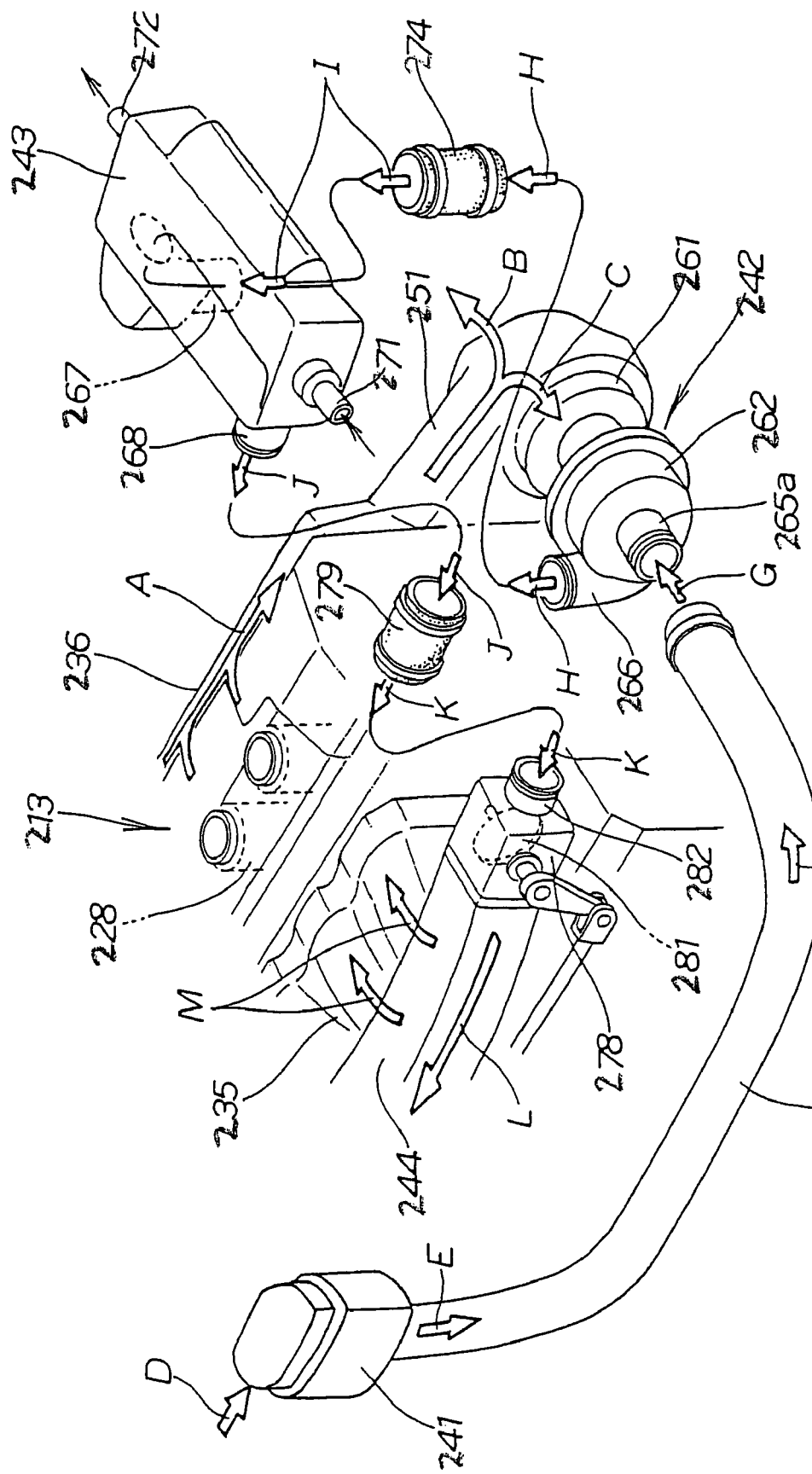
FIG. 5 illustrates an example in which air is sucked into cylinders by means of the air intake structure for the small watercraft according to the invention.

FIG. 5 is a diagram for assistance in explaining the example in which the air intake structure for a small watercraft according to the invention directs air into the cylinders.

Exhaust gas is directed from the inside of the cylinders 228 to the exhaust passage 236 and then directed therefrom to the first exhaust pipe 251 as indicated with arrow A.

Most of the exhaust gas directed to the first exhaust pipe 251 is directed as indicated with arrow B and then discharged through the second exhaust pipe 252, the exhaust body 253, the water muffler 254 and the exhaust hose 255 shown in FIG. 2.

On the other hand, the remaining of the exhaust gas directed to the first exhaust pipe 251 is directed to the turbine casing 261 as indicated with arrow C. The exhaust gas directed to the turbine casing 261 rotates turbine impellers (not shown).

The rotating turbine impellers rotate compressor impellers (not shown) in the compressor casing 262.

Air is sucked in the air cleaner 241 as indicated with arrow D simultaneously with the rotation of the compressor impellers. The air sucked in the air cleaner 241 is directed in the air introduction pipe 46 as indicated with arrows E and F.

The air sucked in the air introduction pipe 246 is directed to the compressor casing 262 of the turbocharger 242 as indicated with arrow G Since the compressor impellers (not shown) in the compressor casing 262 are rotated as described earlier, the air directed in the compressor casing 262 is compressed and delivered therefrom as indicated with arrow H.

The air delivered from the compressor casing 262 is directed to the air inlet 267 of the inter-cooler 243 as indicated with arrow I through the inter-cooler communicating hose 274 and then directed therefrom into the inter-cooler 243.

Cooling fluid or water is directed from the water inlet 271 into the inter-cooler 243. The directed cooling fluid or water cools the air directed into the inter-cooler 243 from the compressor casing 262 and is discharged from the fluid or water outlet 272 to the outside.

The air cooled in the inter-cooler 243 is directed to the air outlet 268 and then directed therefrom to the connection hose 279 as indicated with arrow J.

The air directed to the connection hose 279 is then directed therefrom to the valve housing passage 278 as indicated with arrow K.

The air directed to the valve housing passage 278 is directed via the throttle valve 281 to the distribution passage 244 as indicated with arrow L.

The air directed to the distribution passage 244 is directed to the intake passage 235 as indicated with arrow M and then supplied therefrom into the cylinders 228.

In addition, the embodiment is exemplarily described as follows: One side and the other side of the plurality of cylinders 228 are taken as the left side and the right side, respectively, and the intake passage 235 and the exhaust passage 236 are disposed on the left side and right side, respectively, of the cylinders 228. However, the invention is not limited to this embodiment. It is possible that one side and the other side of the plurality of cylinders 228 are taken as the right side and the left side, respectively, and the exhaust passage 236 and the intake passage 235 are disposed on the left side and right side, respectively, of the cylinders 228.

Further, in the embodiment the turbocharger 242 which is driven by using exhaust gas is exemplified as a supercharger. However, the invention is not limited to this embodiment. For example, a mechanically driven supercharger which is driven using the rotation of the crankshaft of the engine 213 or other superchargers may be employed.

Further, in the embodiment the connection hose 274 is exemplified as the inter-cooler connection portion. However, the present invention is not limited to this embodiment. For example, an aluminum-made connection pipe may be used instead.

An exemplary embodiment of the invention is described below. The rear end portion 278a of the valve housing passage 278 is connected to the air outlet 268 of the inter-cooler 243 by means of the connection hose 279. However, the invention is not limited to this embodiment. For example, an aluminum-made connection pipe may be used instead.

The present invention is preferably applicable to a small watercraft equipped with an air intake structure in which a supercharger is disposed rearwardly of an engine so as to communicate with an inter-cooler.

An embodiment of the present invention will be described below with reference to FIGS. 6 through 25.

Figure 6:
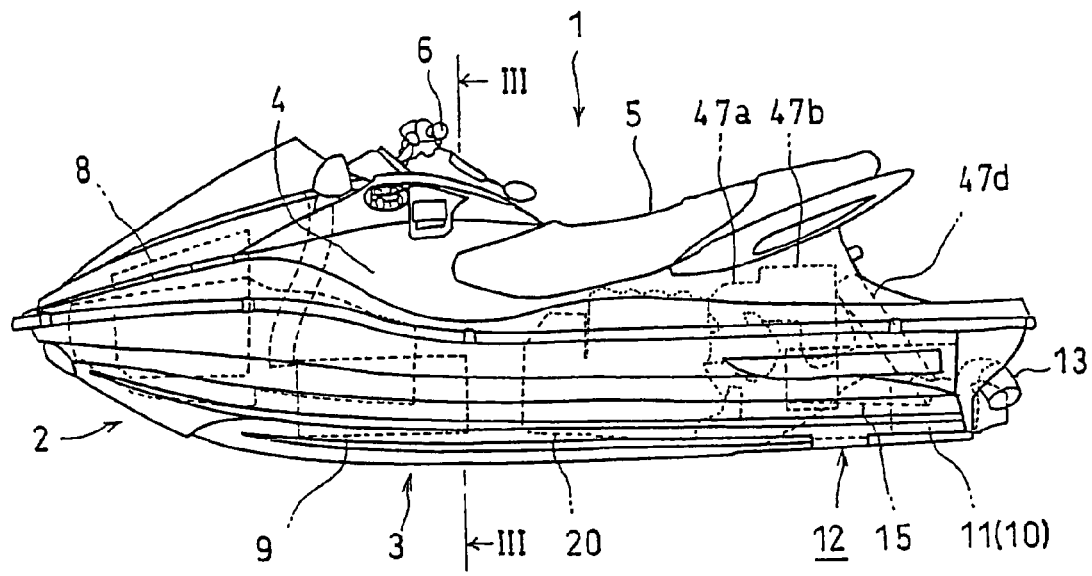
FIG. 6 is a side view of a personal watercraft on which an internal combustion engine is mounted according to an embodiment of the present invention.
Figure 7:
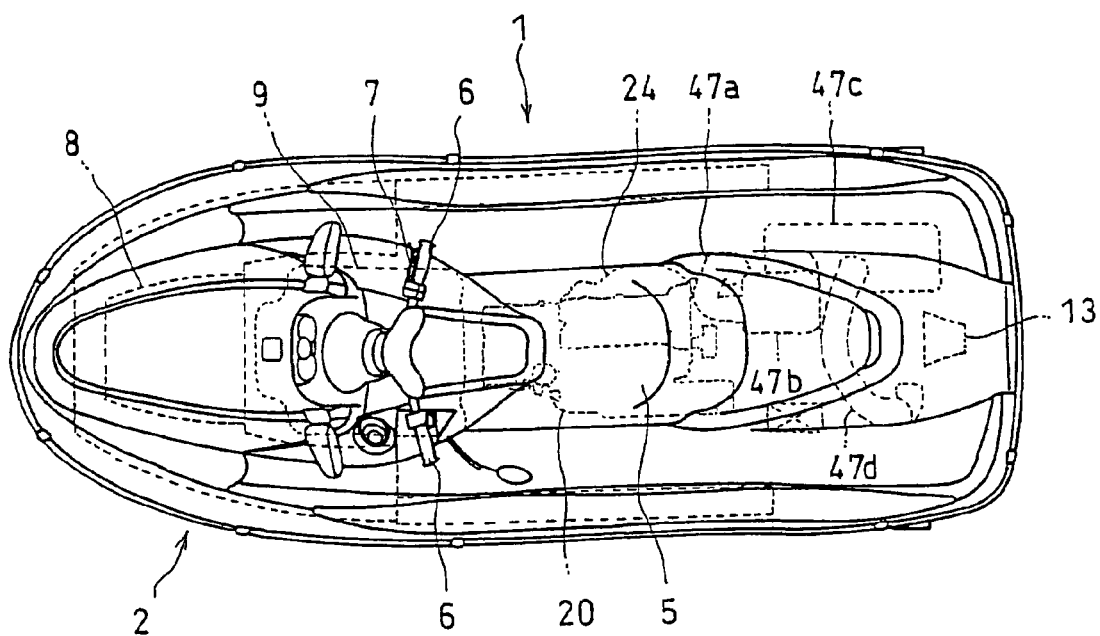
FIG. 7 is a plan view of the personal watercraft of FIG. 1.
Figure 8:
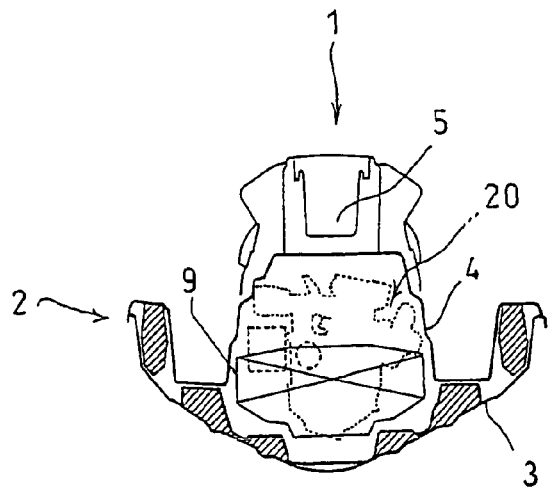
FIG. 8 is a cross-sectional view taken along line III-III in FIG. 1.

As illustrated in FIGS. 6-8, a personal watercraft 1 is a saddle riding type small vessel in which a hull 3 forms a lower side, i.e., a bottom and an upper side with a deck 4 being define in an internal space therebetween and constitute a watercraft body 2 having a floating structure. The internal combustion engine 20 is housed in the internal space of the watercraft body 2. One, two or three occupants sit or mount on a seat 5 in the middle of the deck 4 on the watercraft body 2. One of the occupants operates a handlebar 6 disposed forward of the seat 5 to steer the watercraft 1.

Propulsion means for the personal watercraft 1 is a jet propulsion pump 10 driven by the internal combustion engine 20 and disposed at the rear portion of the hull 3.

Figure 25:
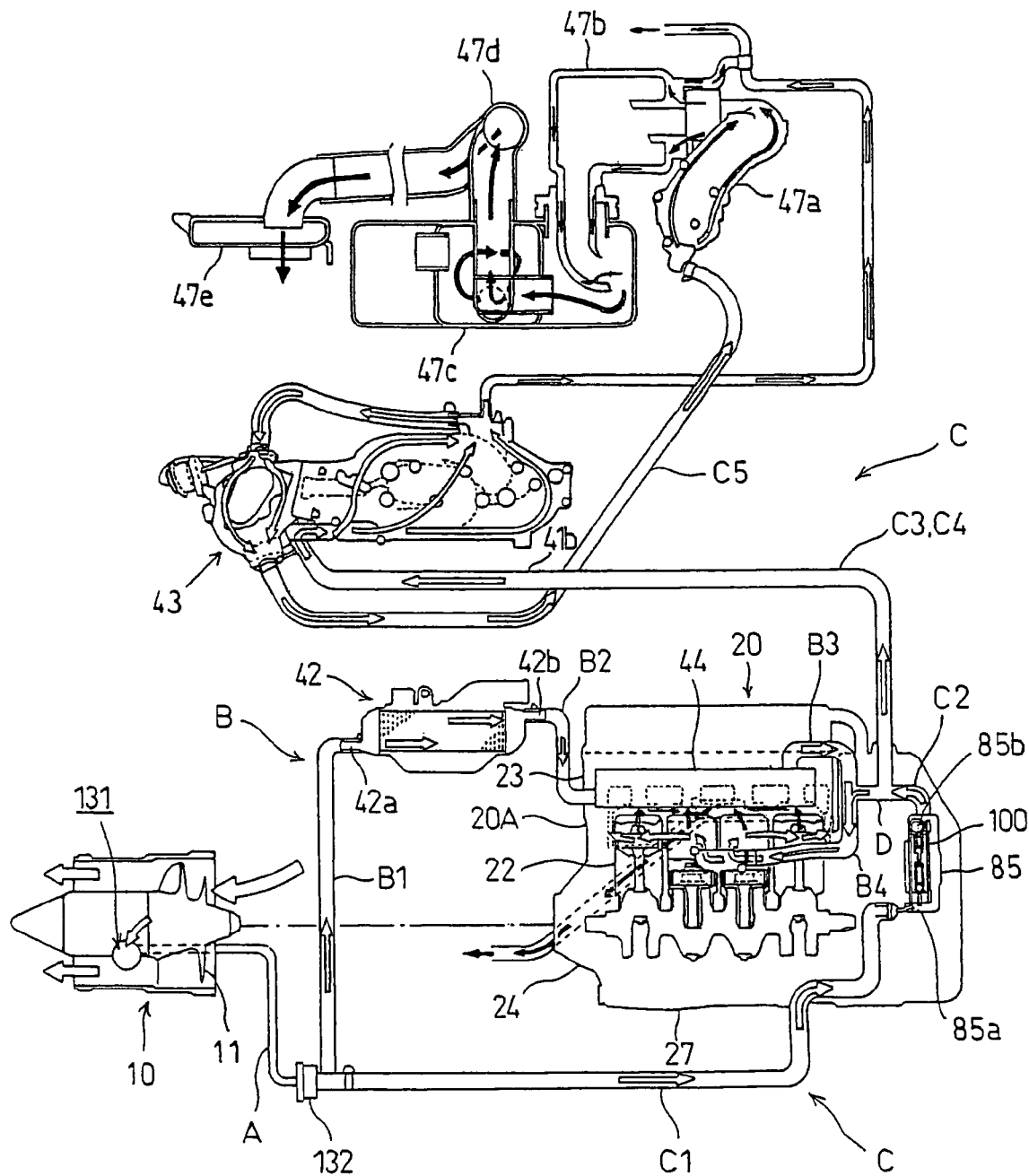
FIG. 25 illustrates a circulation pathway of cooling water.

The jet propulsion pump 10 is an axial pump configured such that an impeller 11 is installed in a channel extending from a water intake 12 opening in the bottom to a nozzle 13 provided at a jet port opening in the rear end of the watercraft body (see FIG. 25). A shaft 15 of the impeller 11 is connected to a crankshaft 21 of the engine 20 via a coupling 56.

Thus, when the impeller 11 is rotationally driven by the engine 20 via the shaft 15, water sucked from the water intake 12 of the bottom is jetted out from the jet port through the nozzle 13. The watercraft body 2 is propelled by the reaction of the jetted water, that is, the personal watercraft 1 glides on the water.

The power of propulsion by the jet propulsion pump 10 is controlled by operating a throttle lever 7 attached to the handlebar 6. Steering the handlebar 6 turnably operates the nozzle 13 through operating wires, thereby changing the direction of the exit of the nozzle 13 to change the moving direction.

The internal combustion engine 20 is disposed at the approximate center of the watercraft body 2 and below the seat 5. The watercraft body 1 includes a storage chamber 8 disposed at the front portion thereof. A fuel tank 9 is disposed between the storage chamber 8 and the combustion engine 20.

The internal combustion engine 20 is a DOHC four-stroke cycle in-line four-cylinder internal combustion engine that is longitudinally disposed in the watercraft body 2 in such a manner that a crankshaft 21 extends in the forward and rearward direction of the watercraft body 2.

Figure 13:
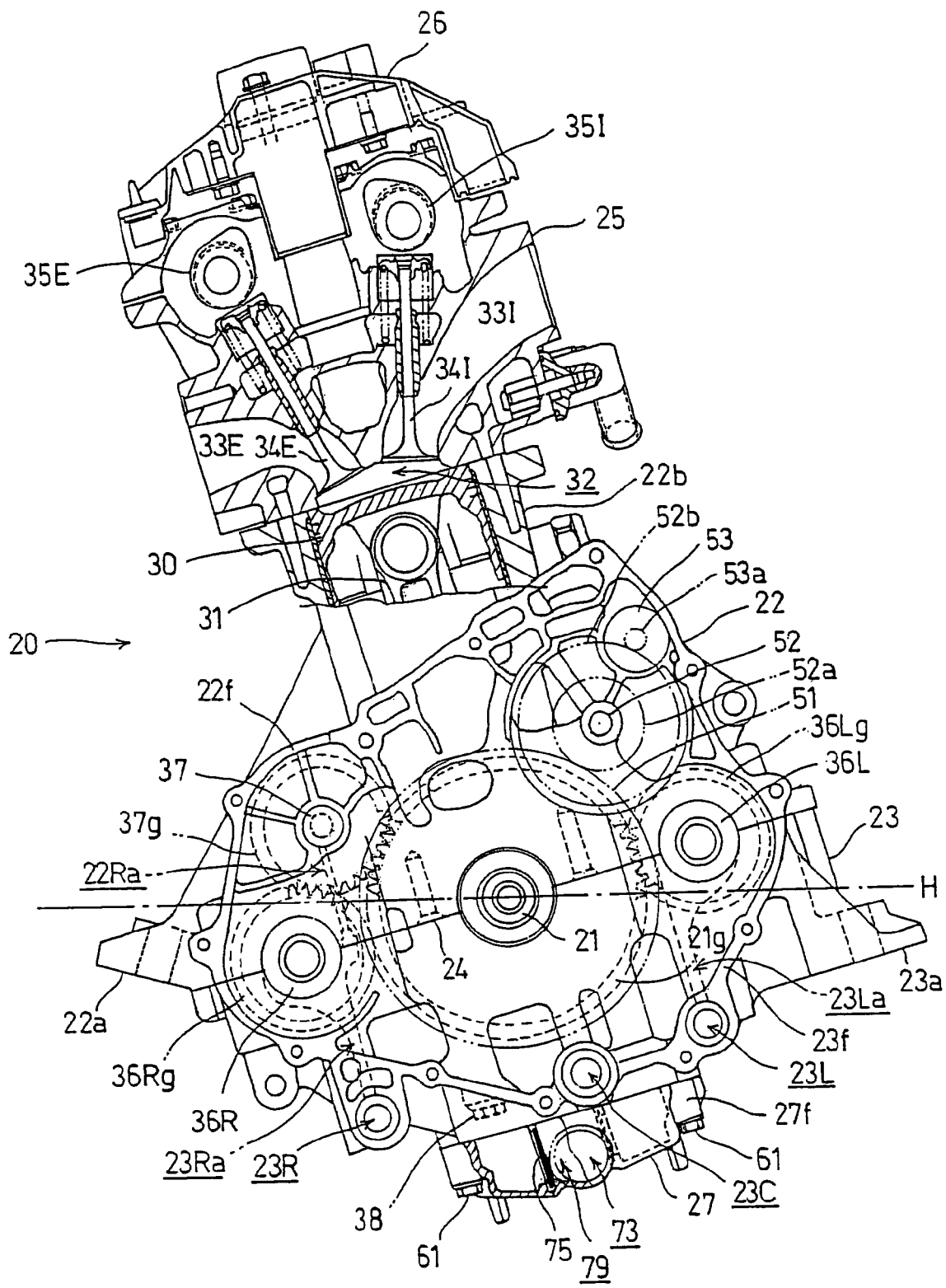
FIG. 13 is a front view of the internal combustion engine with a part in cross-section and with a part omitted.

An internal combustion engine main body or engine body 20A is configured as below. Referring to FIG. 13, a cylinder block 22 and a crankcase 23 are divided at a split face 24 and joined together thereat so as to journal the crankshaft 21 therebetween. A cylinder head 25 is set on the cylinder block 22 and a cylinder head cover 26 is set on the cylinder head 25.

An oil pan 27 is attached to the crankcase 23 from below.

Note that the left and the right are determined on the basis of the moving direction of the watercraft body.

Figure 16:
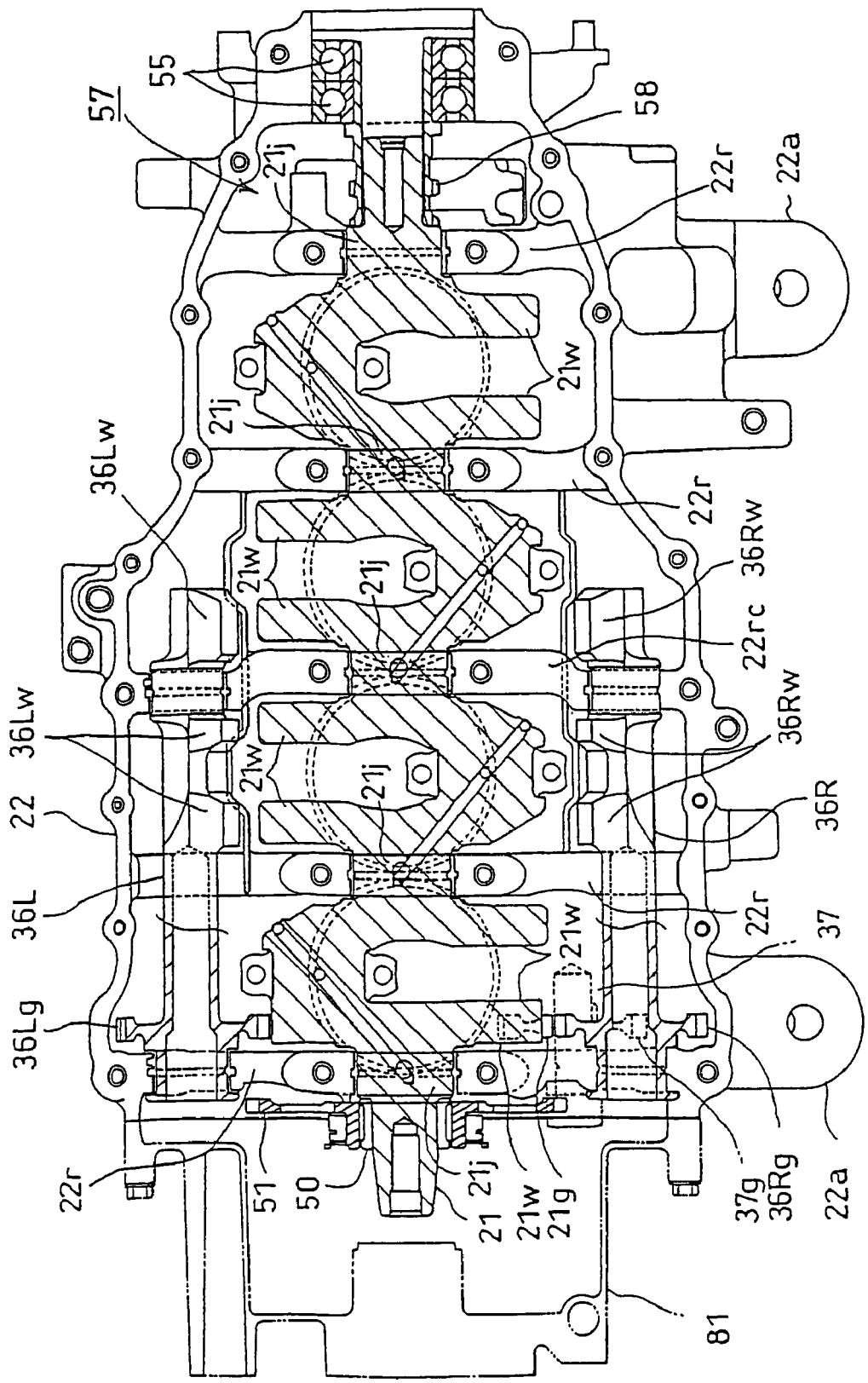
FIG. 16 is a bottom view of the cylinder block with the crankshaft in cross-section.

Mount brackets 22a, 22a are provided at the front and rear lower ends of the right side surface of the cylinder block 22 so as to project obliquely upwardly (see FIGS. 13 and 16). On the other hand, a pair of front and rear mount brackets 23a, 23a are provided parallel to the split face 24 so as to project from the left side surface of the crankcase 23 (see FIGS. 13 and 18).

Figure 9:
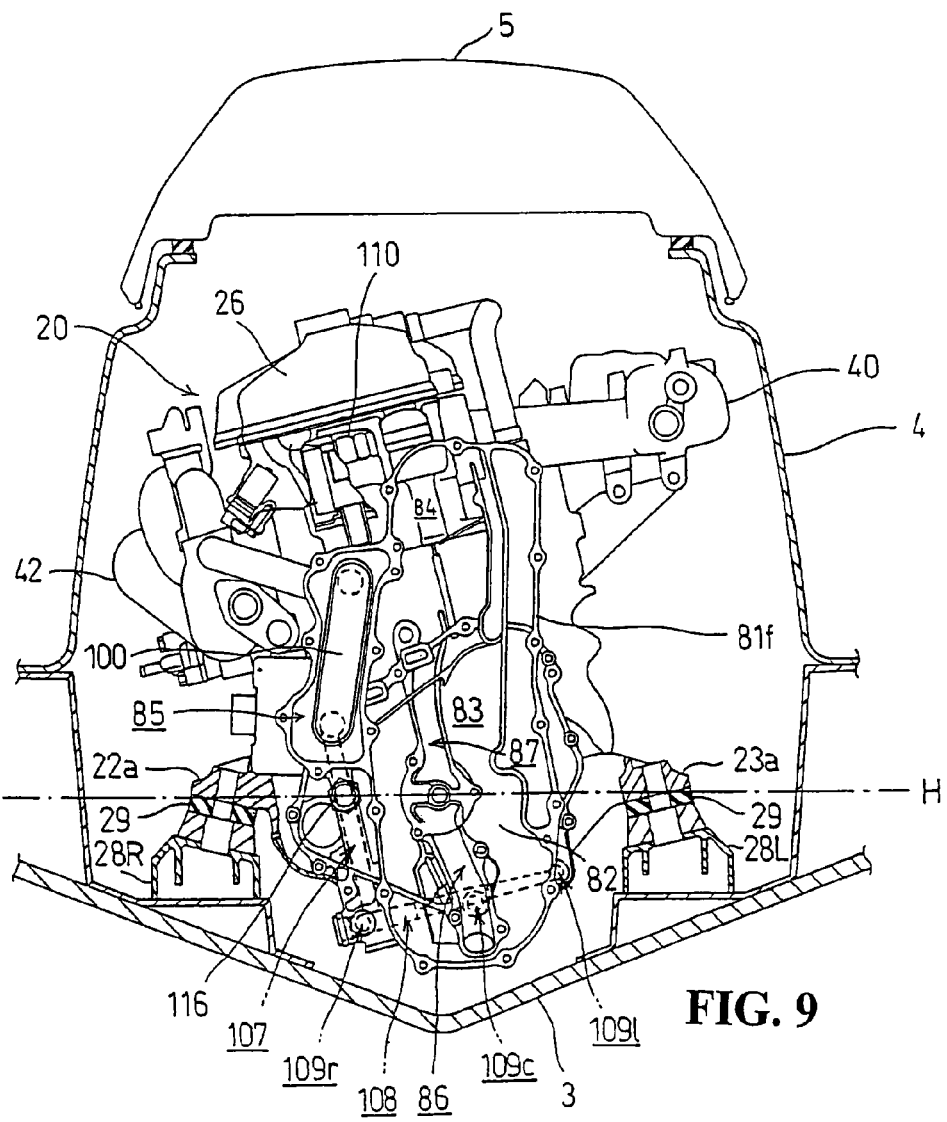
FIG. 9 is a front view of the internal combustion engine with a part in cross-section and with a part omitted.

Thus, the mount brackets 22a and 23a provided on the engine body 20A to project rightwardly and leftwardly, respectively, have an obtuse angle formed therebetween. As shown in FIG. 9, the mount brackets 22a and 23a are respectively attached to base frames 28R and 28L formed on the right and left of the hull 3 in the watercraft body 2 via anti-vibration rubber members 29, 29 at the same horizontal height. The internal combustion engine 20 is mounted and supported in such a manner.

With such an arrangement, the split face 24 between the cylinder block 22 and the crankcase 23 is parallel to the projecting direction of the left side mount bracket 23a. That is, the split face 24 is inclined at an angle diagonally upwardly and to the left relative to the horizontal line H (see FIGS. 9 and 13).

The engine body 20A is configured as discussed below. Cylinders 22b of the cylinder block 22 are formed to extend vertically with respect to the split face 24. The cylinder head 25 and the cylinder head cover 26 are provided along the extending direction of the cylinders. In addition, also the oil pan 27 is attached to the crankcase 23 in a direction vertical to the split face 24. With this configuration, the engine body 20A is mounted on the watercraft body 2 so as to be entirely inclined to the right side.

As shown in FIG. 13, a piston 30 reciprocates in the cylinder 22b and is inclined to the right to rotate the crankshaft 21 through a connecting rod 31.

The cylinder head 25 placed on the cylinder 22b is formed with a combustion chamber 32 facing the top surface of the piston 30. An intake port 33I and an exhaust port 33E each having an opening in the combustion chamber 32 and extend to be formed on the left side and right side, respectively.

A camshaft 35I slidingly moves an intake valve 34I for opening and closing the opening of the intake port 33I. A camshaft 35E slidingly moves an exhaust valve 34E for opening and closing the opening of the exhaust port 33E. The camshafts 35I and 35E are provided at a position corresponding to a mating face between the cylinder head 25 and the cylinder head cover 26.

An intake manifold 40 projects from and is connected to the left side of the engine body 20A so as to communicate with the intake port 33I. An exhaust manifold 44 is connected to the right side of the engine 20 so as to communicate with the exhaust port 33E (see FIGS. 9 and 10).

Figure 10:
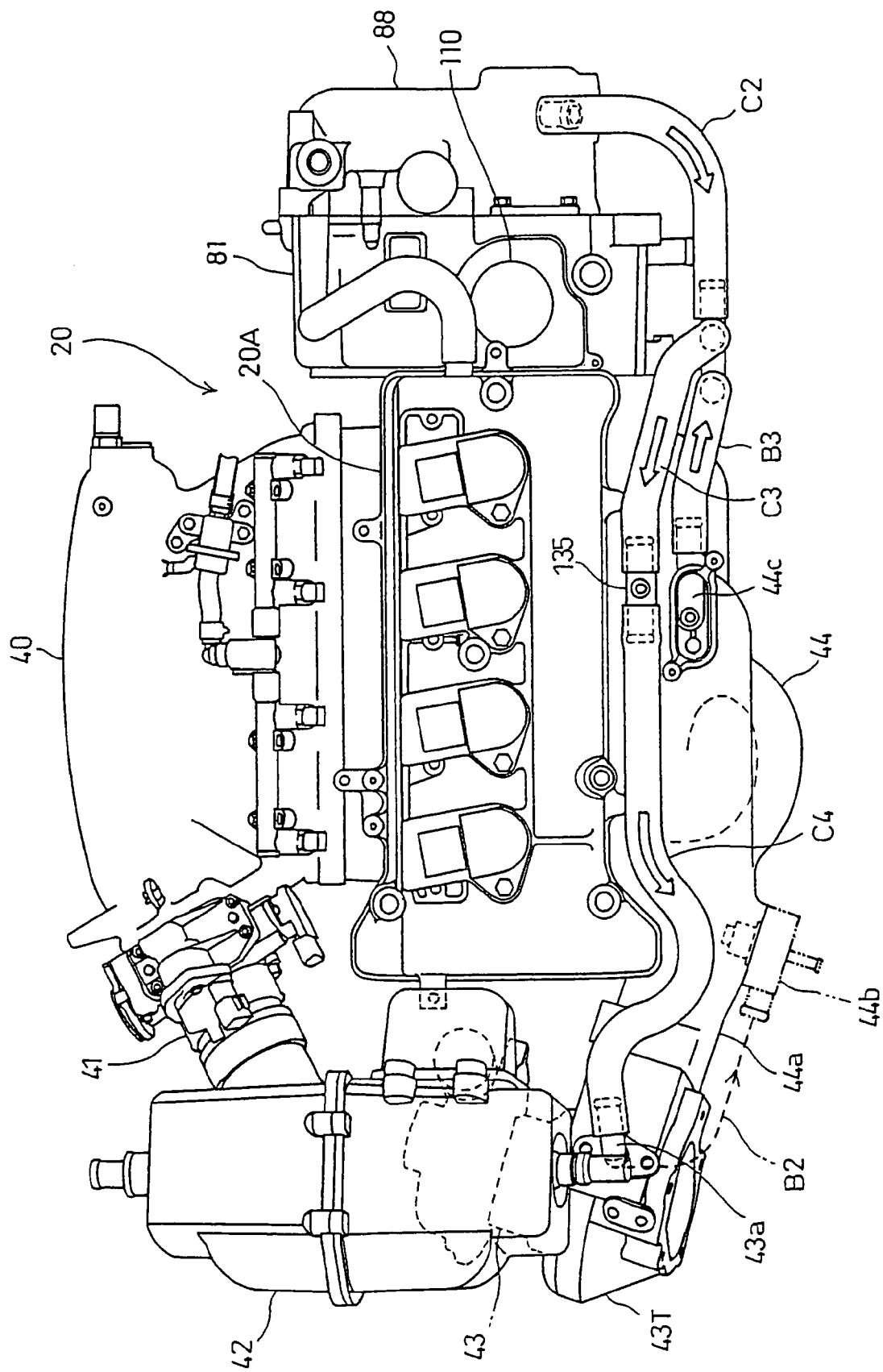
FIG. 10 is a plan view of the internal combustion engine.
Figure 11:
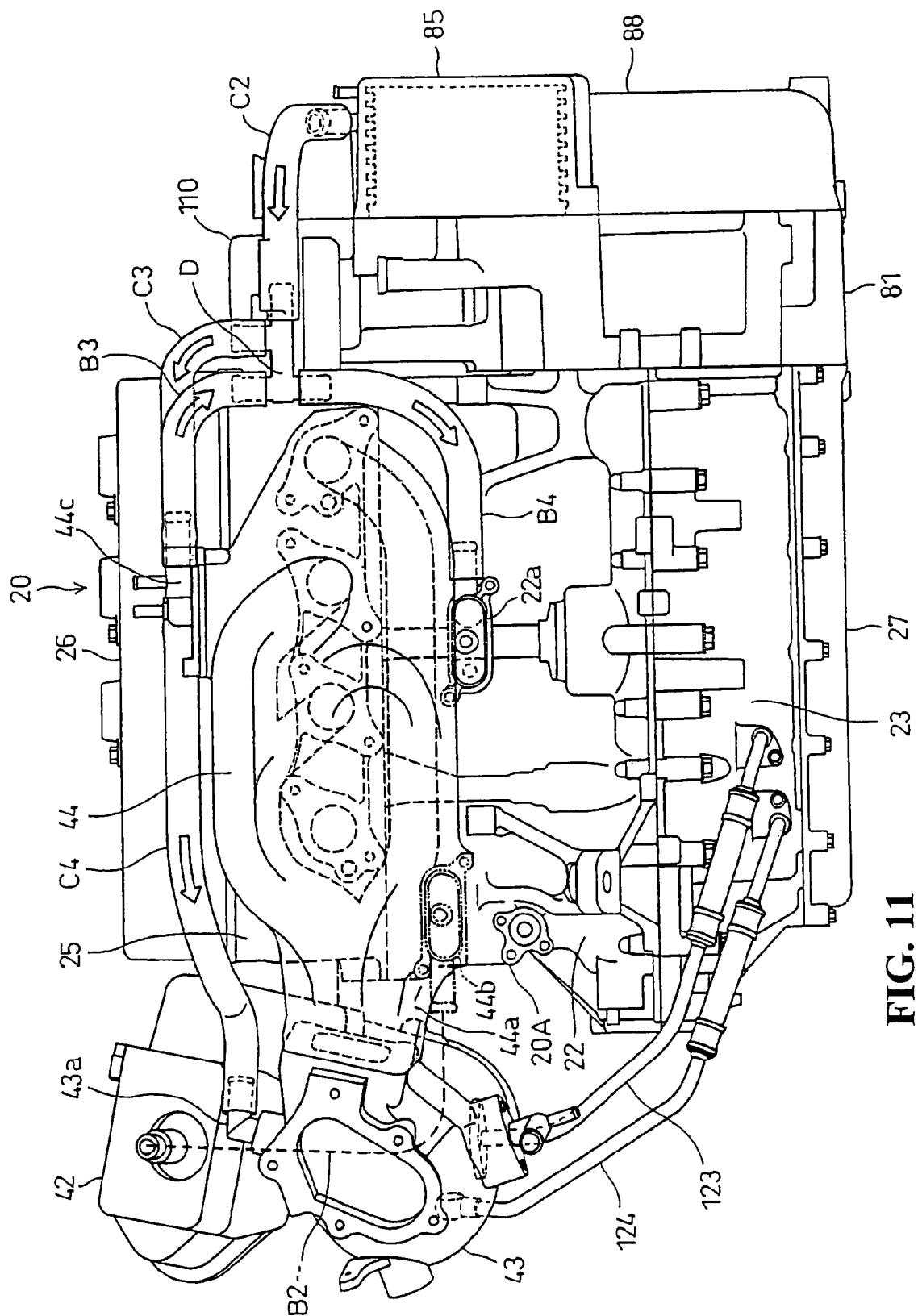
FIG. 11 is a left-side view of the internal combustion engine.
Figure 12:
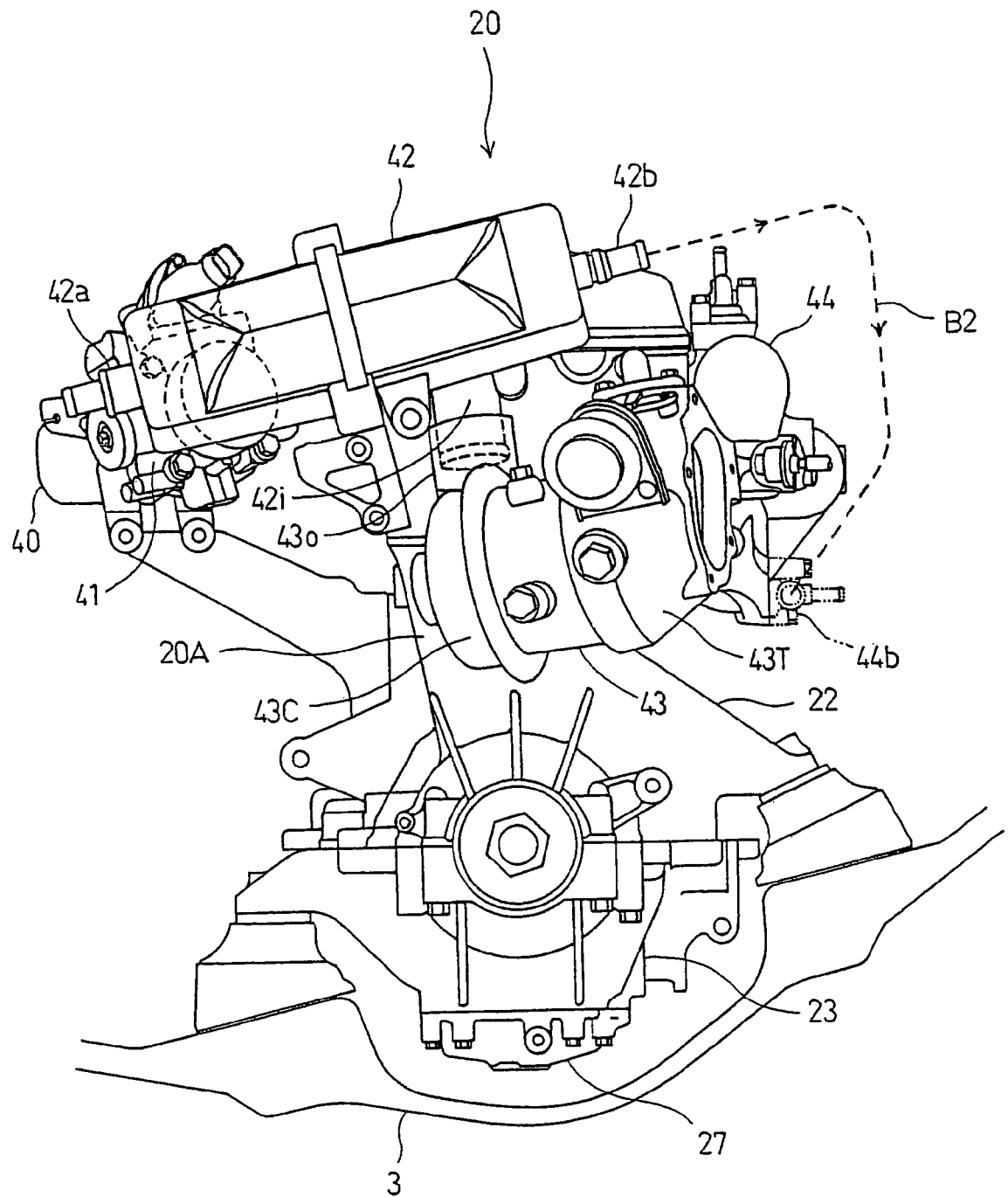
FIG. 12 is a rear view of the internal combustion engine.

An inter-cooler 42 and a turbocharger 43 as a super charger are disposed rearward of the engine body 20A (see FIGS. 10, 11 and 12).

In addition, the supercharger may be any type.

As shown in FIG. 11, the inter-cooler 42 is disposed at a position corresponding to the height of the mating face between the cylinder head 25 and the cylinder head cover 26. The turbocharger 43 is disposed at a position corresponding to the height of the mating face between the cylinder head 25 and the crankcase 23 and right below and close to the inter-cooler 42.

The intake manifold 40 projects on the left side surface of the engine body 20A at a position approximately equal in height to the inter-cooler 42. A throttle body 41 connects the intake manifold 40 to the inter-cooler 42 disposed rearwardly of the engine body 20A.

As shown in FIG. 10, the intake manifold 40, into which intake pipes that are contiguous to the cylinders are assembled, is bent rearwardly along the left side surface of the engine body 20A, and connects with the throttle body 41 shared by the cylinders. The throttle body 41 obliquely extends around the rear of the engine body 20a and connects with the inter-cooler 42.

The throttle body 41 is disposed to extend around the back of the engine body 20A and approaches the inter-cooler 42 disposed to the rear of the engine body 20A. Therefore, the throttle body 41 is directly connected to the inter-cooler 42 without use of additional piping.

An intake route extending from the inter-cooler 42 through the throttle body 41 to the intake manifold 40 smoothly bends from the rear face of and along the left side surface of the engine body 20A.

The inter-cooler 42, the throttle body 41 and the intake manifold 40 are collectively arranged to extend from the rear surface of and along the left side surface of the engine body 20A. In addition, the throttle body 41 is disposed to extend around the back of the engine body 20A. Thus, the rear of the engine body 20A is reduced in width in a lateral (right-to-left) direction.

In addition, the throttle body 41 is disposed to extend around the back of the engine body 20A and approaches the inter-cooler 42 positioned on the back of the engine body 20A. Therefore, the throttle body 41 is directly connected to the inter-cooler 42, thereby reducing piping and the like.

The turbocharger 43 disposed just below the inter-cooler 42 includes a turbine portion 43T connected to the exhaust introduction passage 44a of the exhaust manifold 44 and a compressor portion 43C connected to the inter-cooler 42 positioned above the compressor portion.

In other words, since the turbocharger 43 is disposed right below the inter-cooler 42, a connection pipe 42i extending downwardly from the inter-cooler 42 is directly connected to a connection pipe 43o extending above the compressor portion 43C.

This eliminates piping and the like specifically used for the connection.

In this way, the intake route extending from the turbocharger 43 through the inter-cooler 42 to the intake manifold 40 is effectively configured to minimize the length thereof, thereby minimizing air intake resistance and improving air intake efficiency.

On the other hand, the exhaust route of the internal combustion engine 20 extends from the exhaust manifold 44 through the exhaust introduction passage 44a to the turbine portion 43T of the turbocharger 43. As shown in FIGS. 6 and 7, additionally referring to FIG. 25, the exhaust gas that has rotated the turbine wheel sequentially passes through an exhaust pipe 47a, a backflow prevention chamber 47b, a water muffler 47c, and a pipe 47d and then reaches a water chamber 47e and is discharged therefrom into the water. The backflow prevention chamber 47b is adapted to prevent reverse flow of water to prevent water from entering the turbocharger and the like when the watercraft turns over.

As described above, the crankshaft 21 is rotatably journaled by the bearings at the split face 24 between the cylinder block 22 and the crankcase 23. In addition, two balancer shafts 36L and 36R are journaled by the bearings on the left side and the right side, respectively, of the crankshaft 21 so as to cancel secondary oscillation.

Five crank journals 21j are gripped and rotatably carried by semicircular bearing portions formed on five ribs 22r, 23r through metal bearings. The five crank journals 21j consists of three crank journals 21j between four pairs of crank webs 21w corresponding to the four cylinders and two crank journals 21j, one of which is disposed forward of the three crank journals and the other of which is disposed rearward of the three crank journals. The five ribs 22r are formed on the upper side, namely, on the cylinder block 22 to be formed as vertical walls in the back-and-forth direction. Similarly, the five ribs 23r are formed on the lower side, namely, on the crankcase 23 to be vertical walls in the back-and-forth direction. See FIGS. 12 and 14.

FIG. 16 illustrates a bottom view of the cylinder block 22, four ribs 22r, excluding a central rib 22rc, of the five ribs 22r journaling the crankshaft 21 via their bearings that extend planarly, that is, without bend, to the right and left ends. In contrast, the central rib 22rc has right and left ends that bend to be offset forward (the left side in FIG. 16) from the bearing portion supporting the crankshaft 21.

The rear bearing portions of the balancer shafts 36L and 36R are provided at the forward offset left and right portions, respectively, of the central rib 22rc. The front bearing portions of the balancer shafts 36L and 36R are provided on the left and right portions, respectively, of the rib 22r serving as the first front side outer wall.

More specifically, the balancer shafts 36L and 36R are arranged on the left side and right side, respectively, of and in parallel to the crankshaft 21 so as to be offset forwardly of the cylinder block 22. In addition, the balancer shafts 36L, 36R are journaled at their front and rear portions by the front side rib 22r and the central rib 22rc through their metal bearings.

The balancer shafts 36L, 36R have balance weights that are each divided by the central rib 22rc. More specifically, the balancer shafts 36L and 36R have balance weights 36Lw and 36Rw, respectively, disposed between the central rib 22rc and the rib 25r in front of the central rib 22rc and balance weights 36Lw and 36Rw, respectively, which project rearwardly from the central rib 22rc in a cantilever state.

The cylinder block 22 is such that its front portion provided with the balancer shafts 36L, 36R is large with respect to the lateral width and its rear portion that is not provided with the balancer shafts 36L, 36R is narrow with respect to the lateral width.

Figure 14:
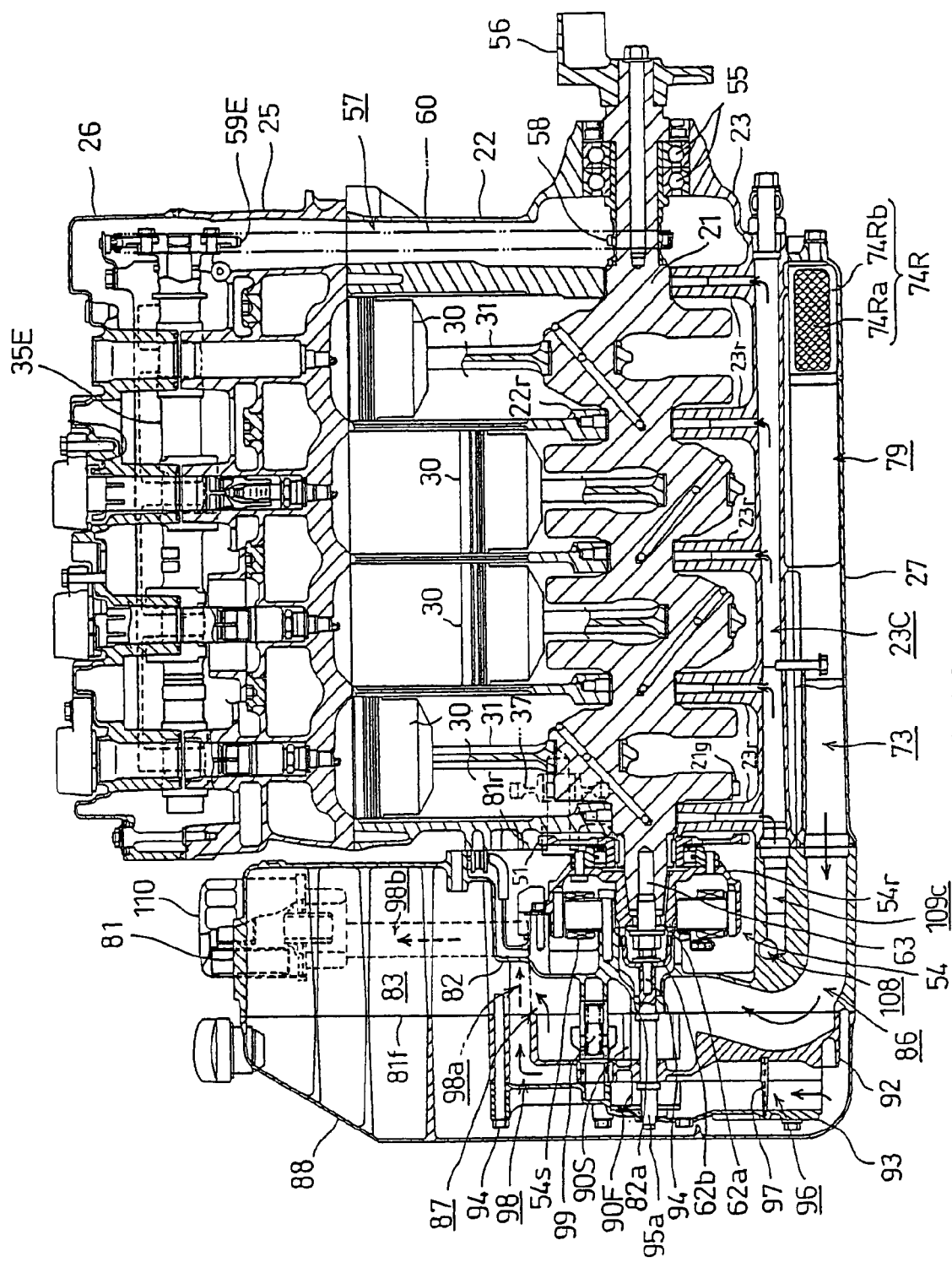
FIG. 14 is a cross-sectional side view of the internal combustion engine.

As shown in FIGS. 14 and 16, a drive gear 21g is formed on the outer circumference of the crank web 21w, of the crankshaft 21, which rotates along the inner surfaces of the ribs 22r, 23r forming the first front outer wall of the cylinder block 22 and the crankcase 23.

On the other hand, driven gears 36Lg and 36Rg are formed on the balancer shafts 36L and 36R, respectively, so as to extend along the inner surfaces of the ribs 22r, 23r forming the first front outer wall.

The driven gear 36Lg of the left side balancer gear 36L directly meshes with the drive gear 21g formed on the outer circumference of the crank web 21w of the crankshaft 21.

On the other hand, as shown in FIG. 13, an intermediate shaft 37 is supported by the rib 22r of the cylinder block 22 at a position obliquely leftward and above the driven gear 36Rg of the right balancer shaft 36R. An intermediate gear 37g is rotatably carried by the intermediate shaft 37 that meshes with the driven gear 36Rg of the right balancer shaft 36R and also with the drive gear 21g formed on the outer circumference of the crank web 21w of the crankshaft 21.

In this way, the left and right balancer shafts 36L and 36R are rotated in directions opposite to each other by the rotation of the crankshaft 21 at a rotation speed twice that of the crankshaft 21, thereby acting to cancel secondary oscillation.

The drive gear 21g, the intermediate gear 37g, and the driven gears 36Lg, 36Rg constitute a gear train that transmits the rotation of the crankshaft 21 to the left and right balancer shafts 36L, 36R. This gear train is disposed inside the cylinder block 22 and the crankcase 23 so as to extend along the inner surfaces of the ribs 22r, 23r forming the first front outer wall. In addition, the gear train is located at the same position in the back-and-forth direction as those of the respective mount brackets 22a and 23a of the cylinder block 22 and the crankcase 23 so as to overlap the brackets 22a, 23a as viewed from the side.

Thus, the rigidity of the surroundings of the gear train transmitting rotational power and the bearing portions of the balancer shafts 36L, 36R in the cylinder block 22 and the crankcase 23 can be ensured sufficiently without addition of a special structure.

As shown in FIG. 16, a starter driven gear 51 is attached via a one-way clutch 50 to a portion of the crankshaft 21 projecting outwardly from the ribs 22r, 23r forming the outer wall of the cylinder block 22 and the crankcase 23 so as to extend along the outer surfaces of the ribs 22r, 23r. In addition, an outer rotor 54r of an AC generator 54 is attached to the portion of the crankshaft 21 in front of the starter driven gear 51 (see FIG. 15).

As indicated with a two-dot chain line in FIG. 8, a small-diameter gear 52a is rotatably carried by the reduction gear shaft 52 that meshes with the starter driven gear 51. A large-diameter gear 52b is integral with the small-diameter gear 52a that meshes with a drive gear 53a fitted to the drive shaft of the starter motor 53 located above the left balancer shaft 36L.

On the other hand, as shown in FIG. 14, a rear end portion of the crankshaft 21 is journaled by the bearing portion of the rear walls of the cylinder block 22 and the crankcase 23 via bearings 55 and projects rearwardly. This rear end portion is coupled via a coupling 56 to a shaft 15 to be connected to the impeller 11 of the jet propelling pump 10.

Figure 17:
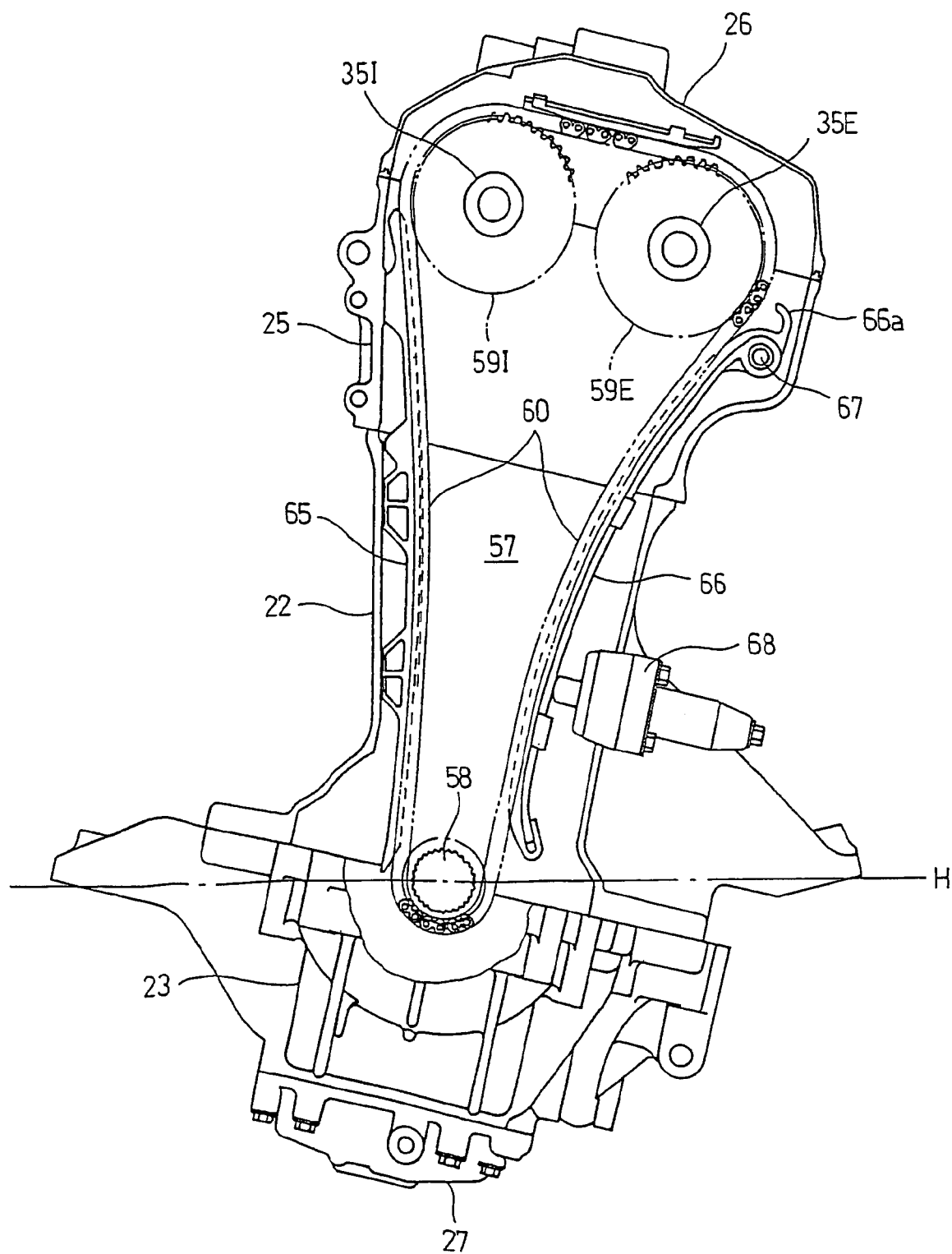
FIG. 17 is a rear view illustrating the inside of a cam chain chamber.

Referring to FIG. 14, a cam chain chamber 57 is defined between the rear walls of the cylinder block 22 and the crankcase 23 and the rearmost ribs 22r, 23r. A drive sprocket 58 is fitted to the crankshaft 21 in the cam chain chamber 57. A cam chain 60 is wound around the drive sprocket 58 and driven sprockets 59I and 59E fitted respectively to the rear end portions of the cam shafts 35I and 35E disposed above the drive sprocket 58 as shown in FIG. 17.

In the cam chain chamber 57, left and right cam chain guides 65, 66 are provided to extend from the cylinder head 25 to the cylinder block 22 along the cam chain 60.

The starboard cam chain guide 66 has an upper end pivotally supported by a pivot shaft 67 that projects from the cylinder head 25. In addition, the cam chain guide 66 has a lower portion that is biased by a cam chain tensioner 68 attached to the cylinder block 22 to press the cam chain 60, thereby applying appropriate tension thereto (see FIG. 17).

In attaching the cam chain guide 66, the cam chain guide 66 is inserted from the upper end opening of the cam chain chamber 57 in the cylinder head 25 and its upper end pivotal-retaining portion is pivotally retained by the pivot shaft 67. However, the pivot shaft 67 is slightly spaced downwardly apart from the upper end opening of the cam chain chamber 57. Therefore, it is not easy to cause the pivot shaft 67 to pivotally retain the upper end pivotal-retaining portion.

To deal with this work, the cam chain guide 66 is formed with a lug 66a which extends upwardly from the upper end and then bends. The lug 66a is gripped to facilitate the work of pivotally retaining the upper end pivotal-retaining portion at the pivot shaft 67.

In addition, the cam chain guide 66 is easily removed since the cam chain guide 66 is formed with the lug 66a.

Figure 18:
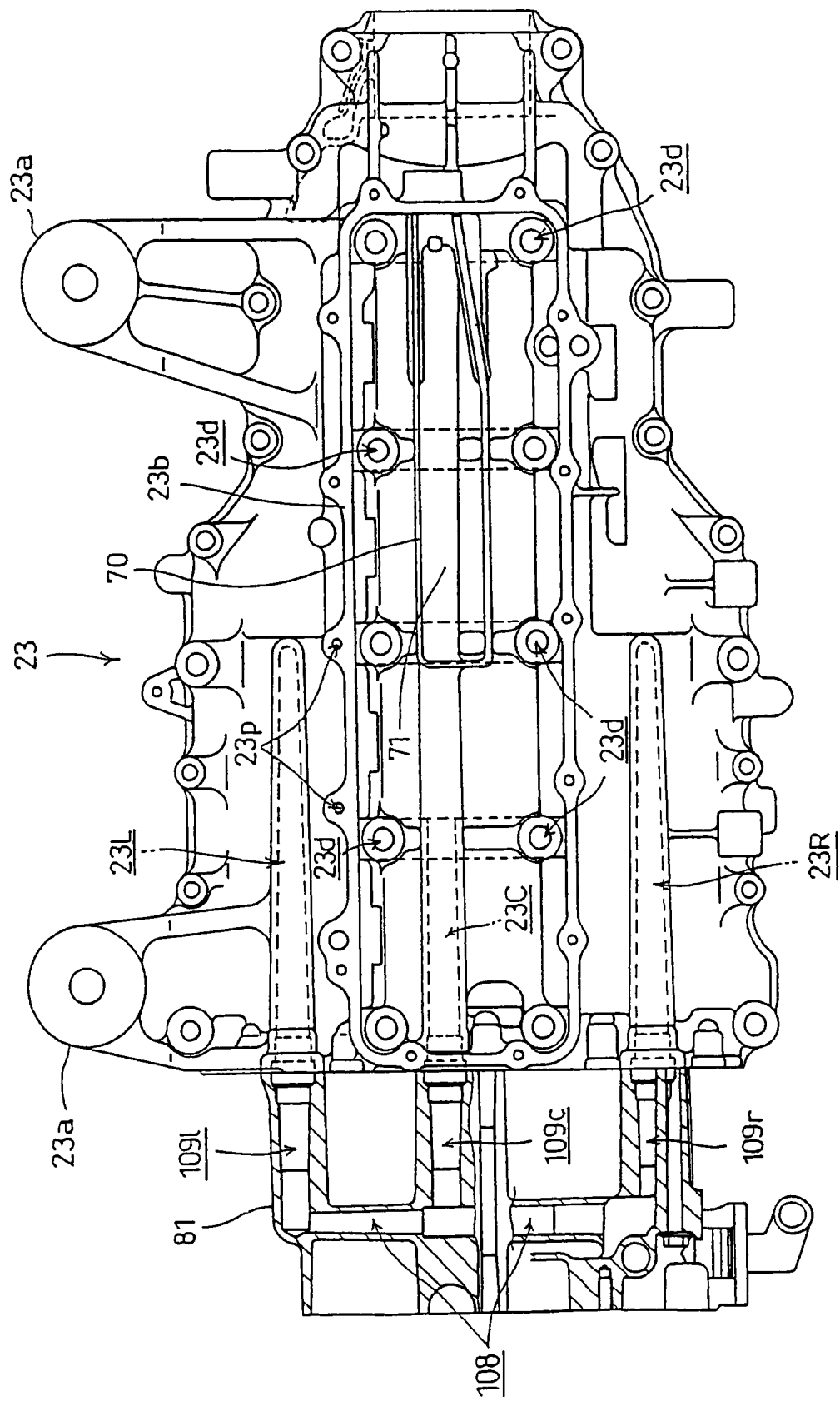
FIG. 18 is a bottom view of a crankcase.

As shown in FIG. 18, the crankcase 23 is formed in its lower surface with a long rectangular opening extending in the back-and-forth direction. A mating surface 23b is formed on the lip of the opening. The oil pan 27 is mounted to the lower surface of the crankcase 23 from below so as to conform to the mating surface 23b.

Figure 19:
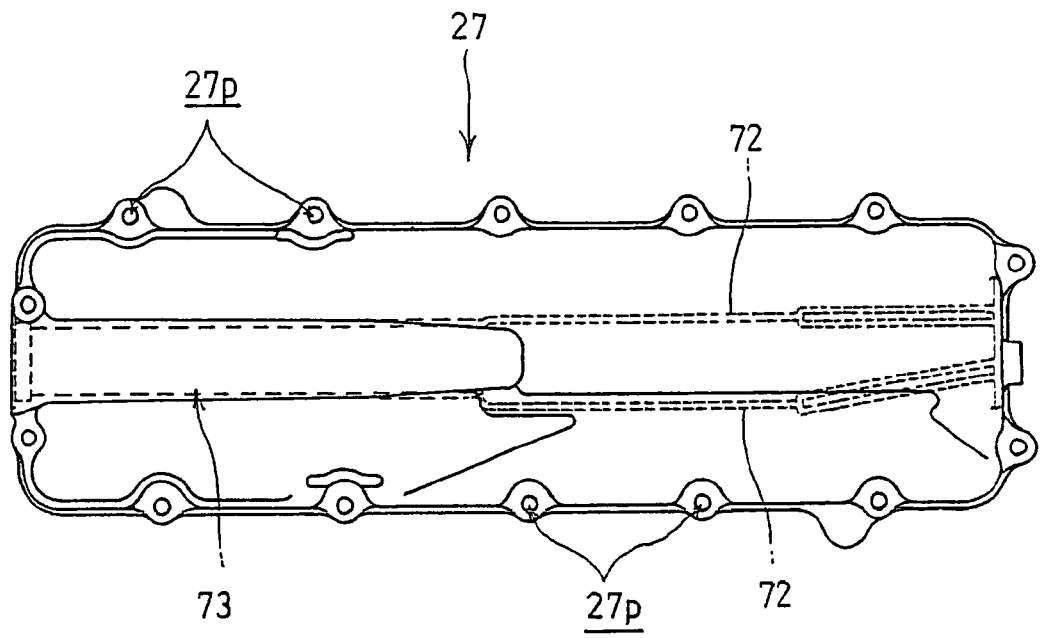
FIG. 19 is a bottom view of an oil pan.
Figure 20:
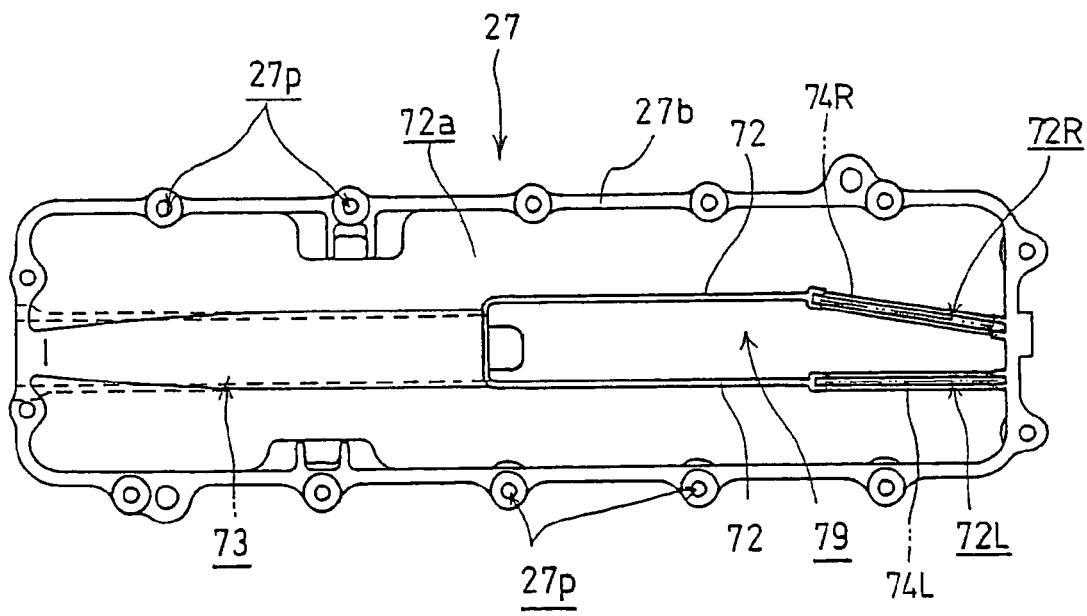
FIG. 20 is a plan view of the oil pan.

The rectangular mating surface 23b is formed with screw holes 23p. As shown in FIGS. 19 and 20, a rectangular lip-mating surface 27b of the oil pan 27 is formed with attachment holes 27p. The oil pan 27 is fixedly mounted to the crankcase 23 by passing bolts 61 through the attachment holes 27p and threading them into the screw holes 23p.

Referring to FIG. 18, a main oil passage 23C runs along the lower surface of the crankcase 23 in the back-and-forth direction and opens in the front wall of the crankcase 23. The five ribs 23r are formed with bolt holes 23d on the right and left of the oil passage 23C. Fastening bolts 38 passing through the bolt holes 23d are threaded into the cylinder block 22. Thus, the crankcase 23 and the cylinder block 22 are fastened to each other and joined together. See FIG. 13.

In addition, left and right balancer oil passages 23L and 23R are provided on the left and right of and in parallel to the main oil passage 23C so as to supply oil to the bearings of the left and right balancer shafts 36L and 36R, respectively. The left and right balancer oil passages 23L, 23R open in the front wall of the crankcase 23. See FIG. 13.

A frame wall 70 formed in a rectangle that is long in the back-and-forth direction is formed in the rear half portion of the rectangular mating surface 23b of the crankcase 23. The frame wall 70 is composed of four sides a front side, a left side, a right side, and a rear side, which is part of the wall of the mating surface 23b. The inside of the frame wall 70 has an upper bottom surface 71 and opens downwardly. See FIG. 18.

The lower end face of the frame wall 70 is equal in height to the mating surface 23 with the oil pan 27.

On the other hand, inside the oil pan 27 as shown in FIGS. 19 and 20, frame walls 72 are provided to extend upright from the bottom surface so as to correspond to the left and right side walls, excluding their rear portions, of the frame wall 70 of the crankcase 23.

An oil recovery passage 73 is provided to extend in a forward direction and is straight and includes a round opening in the front side wall of the frame wall 72. The oil recovery passage 73 opens in the front wall of the oil pan 27 (see FIG. 13) so as to communicate with an oil pump 90 described later.

Referring to FIG. 20, the respective rear portions of the left and right side walls of the frame wall 72 are formed to be a rack in a U-shape. Grooves 72L, 72R are formed in the inner edge portions of the U-shaped rack portions.

In addition, the U-shaped rack portion of the left side wall extends in the back-and-forth direction, whereas the U-shaped rack portion of the right side wall extends obliquely toward the center and also the groove 72R inclines obliquely.

In addition, the communicating port of the left side wall is vertical to the lateral direction. The communicating port of the right side wall is formed such that the rear portion of the right side wall bends toward the center and inclines to approach the center as it goes rearwardly.

Thus, the groove 72L of the U-shaped rack portion of the left side wall and the groove 72R of the U-shaped rack portion of the right wall portion are formed in an almost-V-shape with their rear ends close to each other as viewed from above in FIG. 20.

Oil strainers 74L and 74R formed in a horizontally long rectangle are fitted into the grooves 72L and 72R, respectively, in a substantially vertical manner so as to be arranged in an almost-V-shape.

Figure 21:
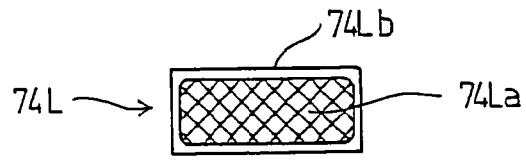
FIG. 21 is a side view of an oil strainer.

FIG. 21 is a side view of the oil strainer 74L.

A rubber member 74Lb is provided in a circumferential edge frame of a rectangular oil screen 74La so as to correspond to the U-shaped lack portion of the left side wall of the frame wall 72.

The other oil strainer 74R has the same configuration as that of the oil strainer 74L. A rubber member 74Rb is provided in a circumferential edge frame of a rectangular oil screen 74Ra so as to correspond to the U-shaped rack portion of the right side wall of the frame wall 72 (see FIG. 14).

While the oil strainers 74L and 74R are fitted into the grooves 72L and 72R, respectively, of the U-shaped rack portions of the frame wall 72, the oil pan 27 is mounted to the crankcase 23. In this case, the end face of the frame wall 70 of the crankcase 23 is brought into abutment against the end face of the frame wall 72 of the oil pan 27. The rubber members 74Lb and 74Rb of the oil strainers 74L and 74R are abutted at their upper ends against the left side wall and the right side wall, respectively, of the frame wall 70. The space inside the oil pan 27 is partitioned by the frame walls 70, 72, the upper bottom surface 71, the bottom surface of the oil pan and the oil strainers 74L, 74R to form a rectangular-parallelepipedonal cavity 79.

The cavity 79 communicates with the oil recovery passage 73 through the opening of the front side wall of the frame wall 72.

Thus, the oil collected in the oil pan 27 passes through the respective oil screens 74La and 74Ra of the oil strainers 74L, 74R, flowing in the cavity 79, and then enters the oil recovery passage 73.

The oil strainers 74L, 74R are arranged in a vertical attitude in the oil pan 27. Therefore, the oil pan 27 can be reduced in the lateral width direction as compared with the arrangement of the horizontal attitude. The oil strainers can easily conform to the shape of the hull 3 which is formed laterally upwardly from the center of the bottom of the personal watercraft. Even if the oil pan is reduced in height, a sufficiently wide space can be provided on each side of the oil strainer. In short, the oil pan itself is reduced in height, thereby reducing the total height of the internal combustion engine.

The oil strainers 74L, 74R are arranged in an almost-V-shape in the rear portion of the oil pan 27. Therefore, the oil that has gathered in the rear portion of the oil pan during acceleration can be easily filtered, and the oil strainers 74L, 74R themselves can be downsized.

While oil lubricates every portion of the cylinder head 25 and drops through the cam chain chamber 57 to return to the oil pan 27, the flow of the oil is not obstructed.

The cavity 79 partitioned by the oil strainers 74L, 74R is defined by the frame wall 70 formed on the crankcase 23, the frame wall 72 formed on the upper bottom surface 71 and the oil pan 27, and the bottom surface of the oil pan. Therefore, a special dedicated component part is eliminated to thereby reducing the number of component parts.

Since the oil strainers 74L, 74R are configured to be gripped by the crankcase 23 and the oil pan 27, they have excellent assembling performance.

The cylinder block 22, the crankcase 23 and the oil pan 27 described above are formed at their front surfaces with the mating surfaces 22f, 23f and 27f, respectively, flush with one another (see FIG. 13). A tank body 81 of an oil tank 80 is joined to the mating surfaces 22f, 23f and 27f.

In addition, the oil tank 80 includes the tank body 81 and a tank cover 88 covered on the front surface of the tank body 81.

As shown in FIGS. 9 and 14, the tank body 81 has mating surfaces 81r and 81f parallel to each other. The mating surface 81r is joined to the mating surfaces 22f, 23f and 27f that are formed on the front surfaces of the cylinder block 22, the crankcase 23 and the oil pan 27, respectively. The mating surface 81f is joined to the tank cover 88. An ACG cover portion 82 is formed to project forward from the mating surface 81r and cover the AC generator 54 and reduction gears 52a, 52b. A generally longitudinally long oil storage portion 83 is formed to extend above and on the left and right sides of the ACG cover portion 82. A water-cooling type oil cooler housing portion 85 is formed on the right side of the oil storage portion 83 so as to partially project at a position higher than the crankshaft 21.

FIG. 9 is a front view illustrating a state in which the tank body 81 is attached to the front surfaces of the cylinder block 22, the crankcase 23 and the oil pan 27.

A reservoir chamber 84 is disposed in a space above the oil storage chamber 83.

As shown in FIG. 14, an outer rotor 54r of the AC generator 54 is fixedly fastened to the leading end of the crankshaft 21 together with a coupling 62a by bolts 63.

The coupling 62a is connected to a coupling 62b at the rear end of the pump shaft 95 of the oil pump 90 described later.

A coupling cover portion 82a covering the couplings 62a, 62b is formed to project rearwardly at the center of the ACG cover portion 82. The coupling cover portion 82a fixedly supports an inner stator 54s of the AC generator 54.

The oil pump 90 is disposed in front of the ACG cover portion 82 covering the AC generator 54 from the front.

The oil pump 90 has a first case 92 attached to the tank body 81 from the front and a second case 93 that is joined to the tank body 81 from the front and attached thereto together with the first case 92 by bolts 94. The pump shaft 95 passes through the front and rear, i.e., the first and second cases 92 and 93 coaxially with the crankshaft 21. In addition, the pump shaft 95 passes through the ACG cover portion 82 and has a rear end to which the coupling 62b is fixedly attached with a bolt 95a from the rear.

An inner rotor is fitted to a shaft portion of the pump shaft 95 in the first case 92 to provide a scavenging pump 90S and an inner rotor is fitted to a shaft portion of the pump shaft 95 in the second case 93 to provide a feed pump 90F.

Thus, the rotation of the crankshaft 21 is transmitted via the couplings 62a and 62b to the pump shaft 95, thereby driving the scavenging pump 90S and the feed pump 90F.

Referring to FIGS. 9 and 14, an oil recovery passage 86 is formed under the tank body 81 to communicate with the oil recovery passage 73 of the oil pan 27. A portion of the oil recovery passage 86 is formed on the rear surface of the first case 92 to extend upwardly and reach the scavenging pump 90S.

Thus, when the scavenging pump 90S is driven, the lubricating oil collecting in the oil pan 27 passes through the oil strainers 74L, 74R, is sucked forward of the oil recovery passage 73 and then passes the oil recovery passage 86, and reaches the scavenging pump 90S disposed above the oil recovery passage 86.

Referring to FIG. 14, a common recovery oil discharge passage 87 is formed above the scavenging pump 90S by the rear surface of the first case 92 and the front surface of the tank body 81. The upper end of the recovery oil discharge passage 87 opens in the oil storage portion 83 of the oil tank 80.

Thus, the recovery oil discharged by driving the scavenging pump 90S passes the recovery oil discharge passage 87 and is recovered by the oil storage portion of the oil tank 80.

Referring to FIG. 14, a supply oil suction passage 96 is formed below the feed pump 90F by the front surface of the first case 92 and the rear surface of the second case 93. In addition, the supply oil discharge passage 98 is formed above the feed pump 90F.

The supply oil suction passage 96 has a lower end opening at a height close to the bottom surface of the oil storage portion 83 and an upper end communicating with a suction port of the feed pump 90F. A screen filter 97 is interposed on the way from the lower end to the upper end.

The supply oil discharge passage 98 extends upwardly from the discharge port of the feed pump 90F and is then bent rearwardly, and connects with a lateral hole 98a formed in the tank body 81.

The lateral hole 98a communicates with a longitudinal hole 98b formed in the tank body 81 and the longitudinal hole 98b extends upwardly. The upper end of the longitudinal hole 98b is in the form of an annular opening that opens in an attachment surface of an oil filter 110 described later, communicating with an oil inlet 111 of the oil filter (see FIG. 15).

Thus, when the feed pump 90F is driven, the lubricating oil is sucked from the lower portion of the oil storage portion 83 of the oil tank 80 through the supply oil suction passage 96. The lubricating oil thus sucked in is discharged to the supply oil discharge passage 98, and is supplied under pressure upward through the lateral hole 98a and the longitudinal hole 98b formed in the tank body 81, reaching the oil filter 110.

In addition, a relief valve 99 is interposed on the way of the supply oil discharge passage 98, namely, to the oil storage portion 83. The relief valve 99 is designed such that if the supply oil has an excessive pressure, excess oil is returned to the oil storage portion 83.

Figure 15:
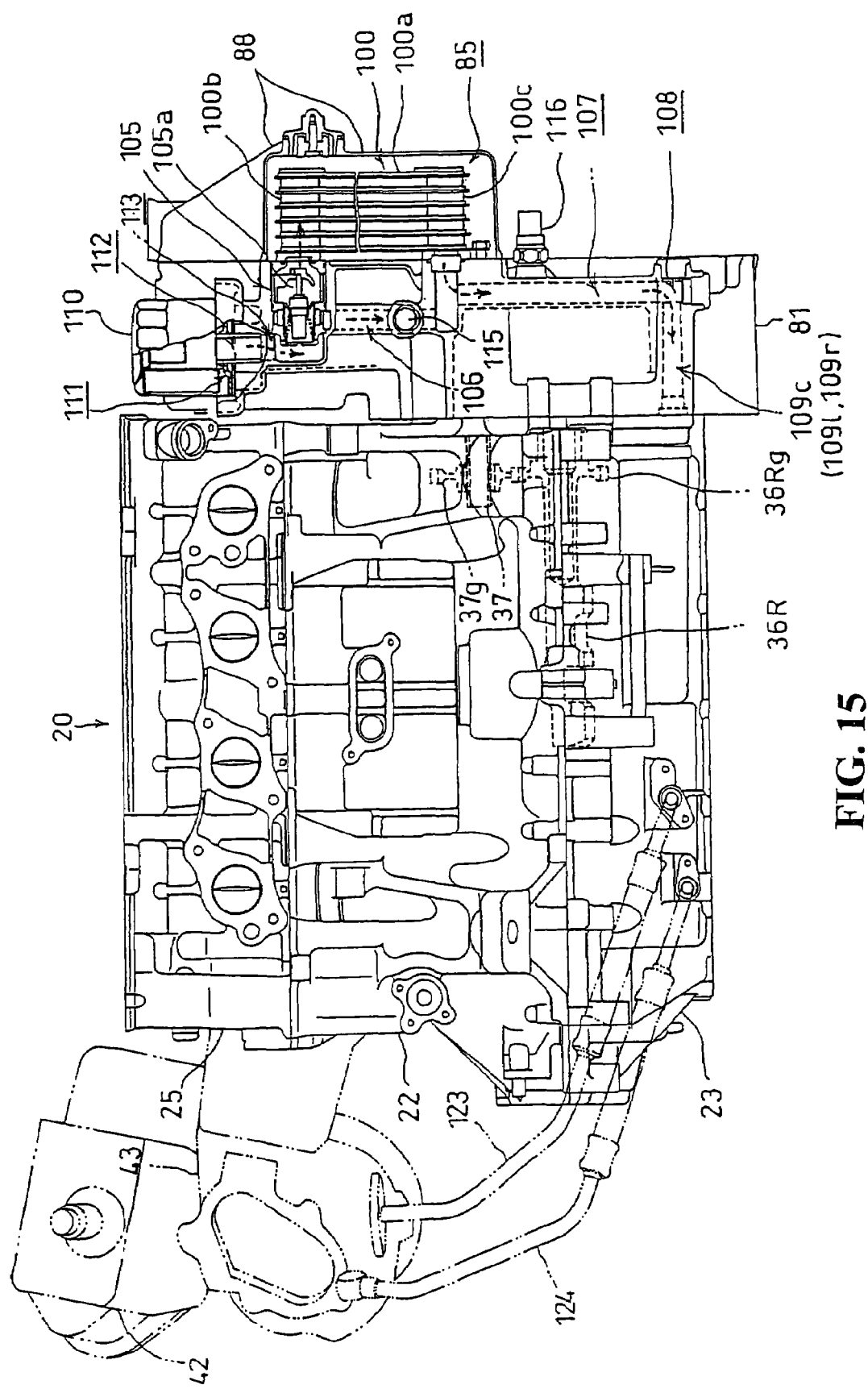
FIG. 15 is a right side view of the internal combustion engine with a part in cross-section and with a part omitted.

As shown in FIGS. 9 and 15, a water cooling type oil cooler 100 projects into an oil cooler housing portion 85 which is formed on the front surface of the tank body 81 so as to extend longitudinally.

The oil cooler 100 includes a plurality of thermal exchange plates 100a adapted to receive oil passing therethrough. An upstream pipe 100b communicates with the inside of the plates 100a at an upper portion of the oil cooler 100 and a downstream pipe 100c communicates with the inside of the plates 100a at a lower portion of the oil cooler 100. The oil cooler 100 is installed on the tank body 81 such that the upstream pipe 100b and the downstream pipe 100c communicate with the upper hole and the lower hole, respectively, formed in the tank body 81.

The oil cooler 100 is covered by part of a tank cover 88 from the forward direction as shown in FIG. 15. Cooling water is allowed to flow in and out of the oil cooler housing portion 85 inside the tank cover 88 to cool the oil in the oil cooler 100.

The upper hole formed in the tank body 81 communicates with the upstream pipe 100b of the oil cooler 100 that communicates with one of outlets of an oil thermostat 105. The oil thermostat 105 is disposed rearwardly of the upstream pipe 100b and is provided with a changeover valve 105a. The lower hole, formed in the tank body 81, communicates with the downstream pipe 100c of the oil cooler 100 that communicates with a longitudinal oil passage 107, which is a downstream oil passage of the oil cooler 100 and extends downwardly.

Another outlet of the oil thermostat 105 communicates with a bypass oil passage 106, which bypasses the oil cooler 100 and communicates with the longitudinal oil passage 107.

As shown in FIG. 15, the inlet of the oil thermostat 105 communicates with an oil outlet 112 of the oil filter 110 attached above the oil thermostat 105 via the upstream oil passage 113 of the oil cooler 100.

The oil filter 110 is adapted to receive the oil that is fed under pressure by the feed pump 90F as described earlier and flows therein through the oil inlet 111 and allows the oil thus filtered to flow out of the oil outlet 112.

The oil thermostat 105 moves the changeover valve 105a to open for the oil cooler 100 and to close for the bypass oil passage 106 when the lubricating oil has a temperature equal to or higher than a predetermined level. The oil thermostat 105 moves the changeover valve 105a to open for the bypass oil passage 106 and to close for the oil cooler 100 when the lubricating oil has a temperature lower than the predetermined level.

A low-pressure oil switch 115 is attached to the bypass oil passage 106 to detect the abnormal lowering of oil pressure. In addition, a high-pressure oil switch 116 is attached to the longitudinal oil passage 107 downstream of the oil cooler 100 and the bypass oil passage 106 to detect the abnormal rise of oil pressure.

As shown in FIG. 15, the low-pressure oil switch 115 is attached to the bypass oil passage 106 so as to project to the right. In contrast, the high-pressure oil switch 116 is attached to the longitudinal oil passage 107 extending vertically to project forwardly using the space below the oil cooler 100.

As indicated with a broken line in FIG. 9, the longitudinal oil passage 107 bends to the left at the lower portion of the tank body 81 and communicates with a transverse oil passage 108. This transverse oil passage 108 has the following three branched pipes extending rearwardly a main gallery supply passage 109c, a left balancer supply passage 109l and a right balancer supply passage 109r (see FIG. 18). The main gallery supply passage 109c is disposed in the center of the three branched pipes to supply oil to the main gallery of the internal combustion engine 20. The left and right balancer supply passages 109l and 109r are disposed on the left side end and right side end of the main gallery supply passage 109c to supply oil to the bearing portions of the left and right balancer shafts 36L and 36R, respectively.

As shown in FIG. 14, the main gallery supply passage 109c communicates with the main oil passage 23C of the crankcase 23. The oil in the main oil passage 23C is distributionally supplied to every bearing portion of the crankshaft 21 via the passages in the ribs 23r.

The left and right balancer supply passages 109l and 109r communicate with the left and right balancer oil passages 23L and 23R, respectively (see FIG. 18). Longitudinal oil passages 23La and 23Ra extend upwardly from the left and right balancer oil passages 23L and 23R communicate with the bearings of the left and right balancer shafts 36L and 36R, respectively. Thus, oil is supplied to the bearings of the left and right balancer shafts 36L, 36R. See FIG. 13.

The right longitudinal oil passage 23Ra reaches the split face 24 between the crankcase 23 and the cylinder block 22 and communicates with a longitudinal oil passage 22Ra formed in the cylinder block 22. The longitudinal oil passage 22Ra reaches the bearing of the intermediate shaft 37. Thus, oil is supplied to the bearing of the intermediate shaft 37.

Figure 22:
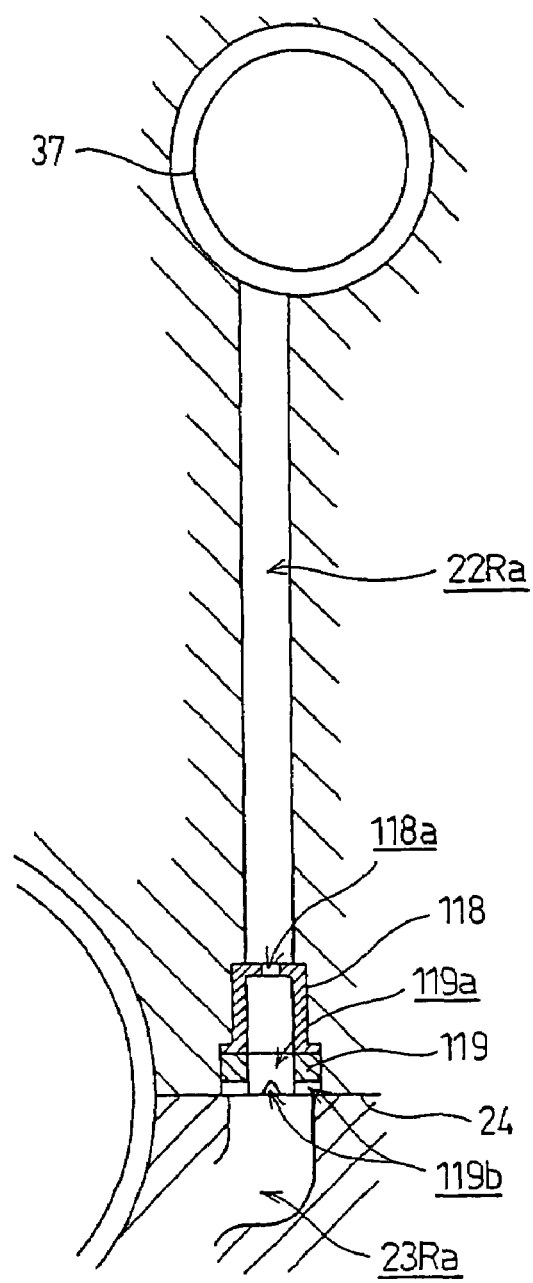
FIG. 22 is an enlarged cross-sectional view of an essential portion of a longitudinal oil passage.

FIG. 22 illustrates a joint between the longitudinal oil passage 23Ra in the crankcase 23 and the longitudinal oil passage 22Ra in the cylinder block 22. Referring to FIG. 22, the longitudinal oil passage 22Ra has a lower portion in which a medium-diameter circular hole portion having an enlarged inner diameter and a large-diameter circular hole portion having an inner diameter greater than the inner diameter of the medium-diameter circular hole portion are sequentially formed. The large-diameter circular hole portion opens at the split face 24 to communicate with the longitudinal oil passage 23Ra in the crankcase 23.

An orifice member 118 is formed in a bottomed cylinder with a flange and includes a small hole 118a formed in its bottom. The orifice member 118 is attached to the lower portion of the longitudinal oil passage 22Ra in such a manner that its cylindrical portion is fitted into the medium-diameter circular hole portion of the longitudinal oil passage 22Ra and its flange portion is fitted to the large-diameter circular hole portion. Further, a hollow disk-like filter 119 is superposed on the flange portion and fitted into the large-diameter circular hole portion.

Figure 23:
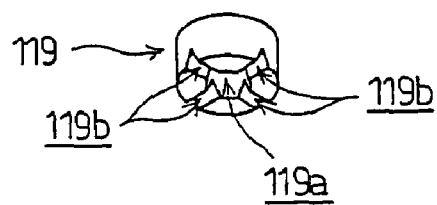
FIG. 23 is a perspective view of a filter.

The filter 119 has an outer diameter equal to the inner diameter of the large-diameter circular hole portion. A hollow circular hole 119a has the same inner diameter as that of the longitudinally oil passage 22Ra. As shown in FIG. 23, V-grooves 119b are crisscross cut on a surface of the filter 119 that faces downwardly when the filter 119 is fitted to the large-diameter circular hole portion of the longitudinal oil passage 22Ra.

When the flange portion and filter 119 of the orifice member 118 are fitted to the large-diameter circular hole portion of the longitudinal oil passage 22Ra, the undersurface of the filter 119 is flush with the slit face 24 of the cylinder block 22. When the cylinder block 22 is superposed on the crankcase 23, the opening end face of the longitudinal oil passage 23Ra presses the outer circumferential edge portion of the filter to support the filter 119 together with the orifice member 118.

In this way, the oil fed to the bearing of the intermediate shaft 37 through the longitudinal oil passage 23Ra and the longitudinal oil passage 22Ra is restricted at the slit face 24 by the orifice member 118. Even if a foreign object that may probably clog the small hole 118a of the orifice member 118 enters the passage, the filter 119 disposed in front of the orifice member 118 blocks the foreign object with its lower surface so that oil may flow through the V-grooves 119b cut crisscross. Thus, it is always ensured that oil can be fed to the bearing of the intermediate shaft 37.

In addition, circulation pathways are formed such that oil is fed from the main oil passage 23C to the bearings of the cam shafts 35I, 35E located above and also to the turbocharger 43, then returning to the oil pan 27.

Figure 24:
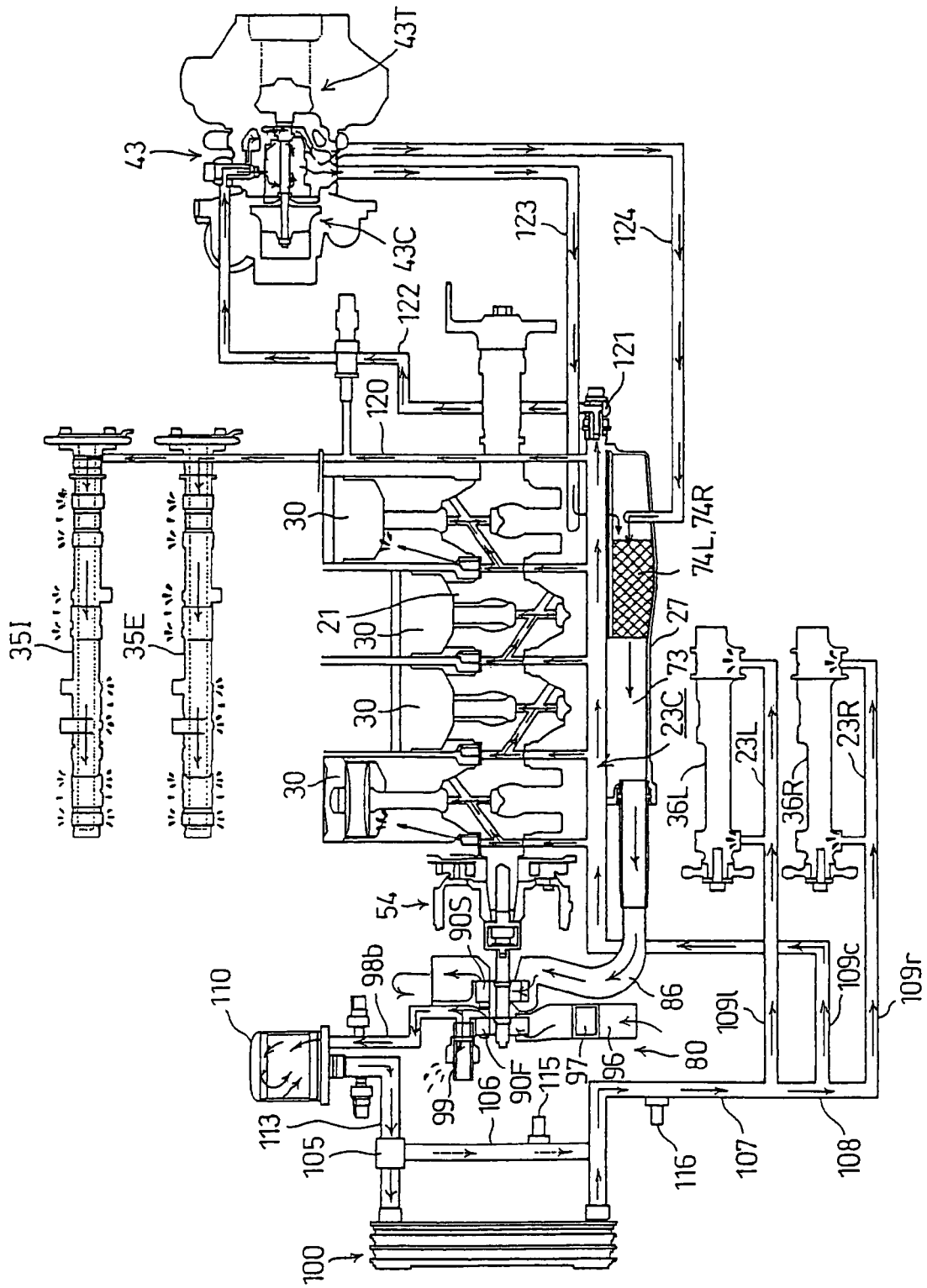
FIG. 24 illustrates a circulation pathway of lubricating oil.

A description is made of the entire lubricating oil circulating pathway illustrated in FIG. 24.

The collecting lubricating oil in the oil pan 27 is sucked by driving the scavenging pump 90S, passes through the oil strainers 74L and 74R to be filtered, then the lubricating oil passes the oil recovery passages 73, 86, and reaches the scavenging pump 90s. The lubricating oil discharged from the scavenging pump 90S is recovered in the oil tank 80.

The lubricating oil recovered in the oil tank 80 is sucked by driving the feed pump 90F and passes through the screen oil filter 97, reaching the feed pump 90F. The lubricating oil discharged from the feed pump 90F passes through the lateral hole 98a and the longitudinal hole 98b, then through the relief valve 99, flowing in the oil filter 110 to be filtered, and reaches the oil thermostat 105.

When the lubricating oil has a temperature equal to or higher than a predetermined level, the oil thermostat 105 moves the changeover valve 105a to the open position for the oil cooler 100 to permit the lubricating oil to flow in the oil cooler 100 to be cooled. On the other hand, when the lubricating oil has a temperature lower than the predetermined level, the oil thermostat 105 moves the changeover valve 105a to the open position for the bypass oil passage 106, permitting the lubricating oil to flow in the bypass oil passage 106 without being cooled, then flow in the longitudinal oil passage 107 downstream thereof.

In addition, the low-pressure oil switch 115 is attached to the bypass oil passage 106 and the high-pressure oil switch 116 is attached to the high-pressure oil switch 116.

The lubricating oil flowing downward in the longitudinal oil passage 107 flows in the three branched passages branched from the transverse oil passage 108 below the longitudinal oil passage 107, then flowing rearward in the lower portion of the crankcase 23.

The lubricating oil distributed into the left and right balancer supply passage 109*l* and 109*r* passes through the left and right balancer oil passages 23L and 23R, then being supplied to the bearings of the left and right balancer shafts 36L and 36R, respectively.

In addition, the lubricating oil fed to the right balancer shaft 36R as described above is further supplied to the intermediate shaft 37 as well.

The lubricating oil distributed into the central main gallery supply passage 109*c* is further distributed while passing the main oil passage 23C, and supplied to every bearing portion of the crankshaft 21.

In addition, the lubricating oil supplied to every bearing portion of the crankshaft 21 is supplied, through the oil passage formed in the crank shaft 21, to the joint portion with the large end portion of the connecting rod 31.

A cam shaft oil supply passage 120 extends upwardly from the main oil passage 23C. The lubricating oil that has flowed upwardly in the camshaft oil supply passage 120 flows in the respective in-shaft oil passages of the left and right camshafts 35I, 35E, being supplied therefrom to every bearing and every cam surface.

The lubricating oil that has lubricated the crankshaft 21, the left and right balancer shafts 36L, 36R, the left and right cam shafts 35I, 35E and the like finally returns to the oil pan 27.

A turbocharger oil supply pipe 122 extends from the main oil passage 23C through the oil filter 121 to the turbocharger 43. Part of the lubricating oil that has flowed in the main oil passage 23C is supplied to the turbocharger 43 through the turbocharger oil supply pipe 122.

The lubricating oil supplied to the turbocharger 43 is distributed into two streams, one of which lubricates the bearings and the other of which blocks heat on the turbine side. Each of the two streams returns to the oil pan 27 through a corresponding one of two oil discharge pipes 123, 124.

On the other hand, the cooling system of the internal combustion engine 20 mounted on the personal watercraft 1 uses water allowing the watercraft 1 to float thereon. FIG. 25 illustrates the cooling water circulation pathway.

Cooling water is introduced, via a cooling water introduction hose A, from a cooling water suction port 131 on the downstream-positive pressure side of the impeller 11 of the jet propulsion pump 10. The cooling water introduction hose A branches, downstream of a one-way valve 132, into a cooling water hose B1 and a cooling water hose C1 which provide a first cooling water route B and a second cooling water route C, respectively.

The first cooling water route B goes to the engine body 20A via the inter-cooler 42 and the exhaust manifold 44. The cooling water hose B1 is coupled to an inflow connection pipe 42*a* disposed on the left side of the inter-cooler 42. A cooling water hose B2 extends in the opposite direction from an outflow connection pipe 42*b* disposed on the right side of the inter-cooler 42. The cooling water hose B2 is connected to an inflow joint member 44*b* attached to the rear portion of the exhaust manifold 44. See FIGS. 10, 11 and 12.

As shown in FIGS. 10 and 11, a cooling water hose B3 is connected to an outflow joint portion 44*c* attached to the upper portion of the exhaust manifold 44. A cooling water hose B4 is connected to the cooling water hose B3 via a branch connection pipe D. In addition, the cooling water hose B4 is connected to an introduction joint member 22*a* of the cylinder block 22.

The water jacket of the cylinder block 22 communicates with the water jacket of the cylinder head 23.

Thus, in the first cooling water route B, the cooling water passing the cooling water hose B1 flows in the inter-cooler 42 to cool intake air. Thereafter, it passes the cooling water hose B2 and flows in the exhaust manifold 44 to cool it. Then, it passes the cooling water hoses B3, B4 and flows in the water jacket of the cylinder block 22 of the engine 20. The cooling water circulates in the cylinder jacket of the cylinder block 22 and the cylinder jacket of the cylinder head 23 to thereby cool the engine 20, and is discharged to the outside of the watercraft body.

The second cooling water route C goes to the exhaust pipe 47*a* via the oil cooler 100. The cooling water hose C1 is connected to an inflow connection pipe 85*a* at the lower portion of the oil cooler housing portion 85 in the oil cooler 100. A cooling water hose C2 extends from a cooling water outflow portion 85*b* at the upper portion of the oil cooler housing portion 85. The cooling water hose C2 is connected to a cooling water hose C3 via the branch connection pipe D. The cooling water hose C is connected to a cooling water hose C4 via a connection pipe 135 installed at the upper portion of the exhaust manifold 44. The cooling water hose C4 extends rearwardly along the right side surface of the cylinder head cover 26 and is connected to an inflow connection pipe 43*a* of the turbocharger 43 (see FIGS. 10 and 11).

As shown in FIG. 25, the cooling water flowing in the turbocharger 43 reaches the exhaust pipe 47*a* and sequentially passes to the backflow prevention chamber 47*b*, the water muffler 47*c*, the pipe 47*d*, and then reaches the water chamber 47*e*.

Thus, in the second cooling water route C, the cooling water passing the cooling water hose C1 flows in the oil cooler housing portion 85 of the oil cooler 100 to cool the lubricating oil. Thereafter, the cooling water passes through the cooling water hoses C2, C3 and C4 and flows in to cool the turbocharger 43, reaching the exhaust pipe 47*a* to cool the exhaust pipe 47*a* and absorb exhaust gas. Then, the cooling water with the exhaust gas thus absorbed sequentially passes through the backflow prevention chamber 47*b*, the water muffler 47*c*, and the pipe 47*d*, reaches the water chamber 47*e* communicating with the water, and is discharged into the water.

The branch connection pipe D shared by the first cooling water route B and the second cooling water route C forms a bypass passage that allows the cooling water hose C2 downstream of the oil cooler housing portion 85 of the oil cooler 100 to communicate with the cooling water hose B4 upstream of the water jacket of the cylinder block 22.

Thus, part of the cooling water passing the oil cooler 100 passes the branch connection pipe D and mixes with the cooling water passing the exhaust manifold 44. Thereafter, the mixed cooling water flows in the water jacket of the cylinder block 22.

The cooling system of the internal combustion engine 20 is configured as described above.

If the cooling water introduced from the cooling water suction port 131 of the jet propulsion pump 10 is allowed to directly flow into the water jackets of the cylinder block 22 and the cylinder head 23 of the internal combustion engine 20, the engine 20 may be probably brought into an excessively cooled state before being warmed-up. This causes a so-called dilution in which fuel passes through the gap between the piston and the cylinder and blends into lubricating oil to dilute it.

To deal with such a dilution in the cooling system, the first cooling water route B allows the cooling water warmed up through the quickly warming exhaust manifold to flow in the water jacket of the cylinder block 22 through the cooling water hoses B3, B4. This alleviates the dilution, thereby suppressing deterioration of the oil.

In contrast, after the internal combustion engine 20 is warmed up, the cooling water passing through the exhaust manifold 44 is excessively heated. Therefore, the engine 20 cannot be cooled efficiently. To deal with this, the cooling system is provided with the branch connection pipe D serving as the bypass passage which allows the cooling water hose B4 with the cooling water hose C2 downstream of the oil cooler housing portion 85. This permits part of the cooling water that has passed through the oil cooler 100 and has been unexcessively heated to pass the branch connection pipe D and mix with the cooling water that has passed through the exhaust manifold 44. Thus, the cooling water flowing in the water jacket of the cylinder block 22 can be kept at a moderate temperature.

In the lubricating system described above, the oil thermostat 105 opens for the oil cooler 100 to cool lubricating oil when the lubricating oil has a temperature not lower than the predetermined level, which makes it possible to accelerate cooling of the internal combustion engine 20.

On the other hand, the oil thermostat 105 opens for the bypass oil passage 106 to bypass the oil cooler 100, that is, not to cool lubricating oil when the lubricating oil has a temperature not lower than the predetermined level. This accelerates a warm-up operation and prevents excessive cooling during cold operation.

The internal combustion engine 20 of the present embodiment is configured as set forth below. The intake manifold 40 into which the intake pipes contiguous to the cylinders are assembled bends rearwardly along the left side surface of the engine body 20A and connects with the throttle body 41. The throttle body 41 is connected to the inter-cooler 42 so as to face obliquely and extent around the rear of the engine body 20A. Therefore, the intake route that goes to the intake manifold 40 from the inter-cooler 42 through the throttle body 41 smoothly bends from the rear surface of and along the left side surface of the engine body 20A. This makes the intake air flow smooth.

The inter-cooler 42, the throttle body 41 and the intake manifold 40 are collectively arranged from the rear surface of and along the left side surface of the engine body 20A. In addition, the throttle body 41 is arranged to extend around the back of the engine body 20A. This reduces the lateral width of the rear of the engine body 20A, thereby making the entire internal combustion engine 20 compact. Thus, a wider open space can be created in the watercraft body.

The throttle body 41 is arranged to extend around the rear of the engine body 20A so as to be brought close to the inter-cooler 42 located to the rear of the engine body 20A. Therefore, the throttle body 41 can be directly connected to the inter-cooler, thereby reducing piping and the like.

As described above, the internal combustion engine 20 of the present invention is equipped with the inter-cooler 42 which is disposed above the turbocharger 43 disposed rearwardly of the engine body 20A so as to cool intake air pressurized by the turbocharger 43. Therefore, the turbocharger 43 and the inter-cooler 42 are directly connected to each other to reduce piping such as a hose and the like.

The inter-cooler 42 is disposed to the rear of the engine body 20A which has a relatively wide space. Therefore, a space can be created on the port side of the engine body 20A, which facilitates the piping of the intake manifold 40.

In addition, only short introduction pipes A, B1 are needed to introduce cooling water into the inter-cooler 42 from the jet propulsion pump 10 disposed in the rear portion of the watercraft body.

The intake manifold 40 bends rearwardly along a side surface of the engine body 20A and is connected to a throttle body 41. The throttle body 41 is connected to the inter-cooler 42 disposed above the turbocharger 43. Therefore, the throttle body 41 is brought close to and directly connected to the inter-cooler 42, which eliminates piping such as a hose and the like.

An air intake distance is minimized which extends from the turbocharger 43 through the inter-cooler 42 to the intake manifold 40, whereby air intake resistance is minimized to improve air intake efficiency.

The intake manifold 40 bends such that the left external edge thereof comes closer to the center of the engine body 20A as it goes to the rear end of the side left external edge. Therefore, the air intake route bends smoothly, which smoothes an air intake flow from the inter-cooler 42 and can reduce the air intake distance.

In addition, since respective spaces on both sides of the rear end portions of the internal combustion engine 20 become wider, a narrow engine compartment can be effectively utilized.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An air intake structure for a small watercraft including an engine mounted on a watercraft body so that a plurality of cylinders are arranged in a row in a forward and rearward direction of the watercraft body, the air intake structure comprising:

an intake passage disposed on at least one side of the cylinders so as to communicate with the cylinders;

an exhaust passage disposed on the other side of the cylinders so as to communicate with the cylinders; and a supercharger disposed rearwardly of the engine so as to communicate with the intake passage via an inter-cooler;

wherein the inter-cooler is disposed rearwardly of the engine with a distribution passage communicating with the intake passage being disposed forward of the inter-cooler and on the one side of the cylinders so as to extend in the forward and rearward direction of the watercraft body; and the inter-cooler communicates with a rear end of the distribution passage, wherein the inter-cooler includes an air inlet disposed on a front wall thereof which faces the forward direction of the watercraft body, the air inlet being adapted to introduce air from the supercharger into said inter-cooler, wherein the inter-cooler is formed substantially in a shape of a rectangular-sided box which has a long dimension that extends transversely in a direction that is substantially horizontal and perpendicular to the forward and rearward direction of the watercraft body, so that the front wall of the inter-cooler faces a rear side of the engine.

2. The air intake structure for the small watercraft according to claim 1, wherein the supercharger is a turbocharger that communicates with the exhaust passage and is driven by exhaust gas directed from the engine through the exhaust passage.

3. The air intake structure for the small watercraft according to claim 1, wherein the rear end of the distribution passage communicates with the front wall of the inter-cooler via a distribution passage communicating portion and the distribution passage communicating portion is provided with a throttle valve.

4. The air intake structure for the small watercraft according to claim 2, wherein the inter-cooler is disposed close to the one side of the cylinders and the turbocharger is disposed close to the other side.

5. The air intake structure for the small watercraft according to claim 1, wherein said inter-cooler includes an air outlet disposed on the front wall thereof for discharging air from the inter-cooler, said air outlet being in communication with the distribution passage and the intake passage of the engine.

6. The air intake structure for the small watercraft according to claim 1, and further including a fluid inlet passage for introducing a cooling fluid into said inter-cooler and a fluid outlet for discharging the cooling fluid therefrom,
wherein the fluid inlet passage extends transversely and faces a port side of the watercraft body and the fluid outlet passage extends transversely faces the starboard side of the watercraft body.

7. An internal combustion engine with a supercharger for a personal watercraft, mounted in a watercraft body defined by a hull and a deck for directing a crankshaft in a forward and rearward direction of the watercraft body for driving a jet propulsion pump, the internal combustion engine comprising:
an inter-cooler disposed rearwardly of an engine body;
an intake manifold being contiguous to cylinders of the engine, bending rearwardly of and along a side surface of the engine body, and being connected to a throttle body; and
the throttle body extending around the rear of the engine body and connected to the inter-cooler,
wherein the inter-cooler includes an air inlet disposed on a front wall thereof which faces the forward direction of the watercraft body, the air inlet being adapted to introduce air from the supercharger into said inter-cooler,
wherein the inter-cooler is formed substantially in a shape of a rectangular-sided box which has a long dimension that extends transversely in a direction that is substantially horizontal and perpendicular to the forward and rearward direction of the watercraft body, so that the front wall of the inter-cooler faces a rear side of the engine body.

8. The internal combustion engine for the personal watercraft according to claim 7,
since the inter-cooler is formed substantially in the shape of the rectangular-sided box having the long dimension extending transversely across the watercraft body,
the supercharger is able to be disposed rearwardly of the engine body and directly below the inter-cooler.

9. The internal combustion engine for the personal watercraft according to claim 7, wherein said intake manifold is operatively connected to said throttle body for connecting said inter-cooler to said intake manifold.

10. The internal combustion engine for the personal watercraft according to claim 9, wherein said throttle body extends around the rear side of the engine body and is directly connected to the front wall of said inter-cooler for reducing piping therebetween.

11. The internal combustion engine for the personal watercraft according to claim 7, wherein a connection of the intake manifold, the throttle body, and the inter-cooler is smoothly bent from the rear side of the engine body to extend along one side of the engine body.

12. The internal combustion engine for the personal watercraft according to claim 7, wherein a wide space is provided on the personal watercraft by positioning the inter-cooler to the rear side of the engine body and smoothly connecting the intake manifold to the throttle body and to the inter-cooler.

13. An internal combustion engine for a personal watercraft having a multi-cylinder internal combustion engine with a supercharger mounted in a watercraft body defined by a hull and a deck so as to direct a crankshaft in a forward and rearward direction of the watercraft body and for driving a jet propulsion pump, the internal combustion engine comprising:
the supercharger being disposed rearward of an engine body; and
an inter-cooler disposed above the supercharger to cool intake air pressurized by the supercharger,
wherein the inter-cooler includes an air inlet disposed on a front wall thereof which faces the forward direction of the watercraft body, the air inlet being adapted to introduce air from the supercharger into said inter-cooler,
wherein the inter-cooler is formed substantially in a shape of a rectangular-sided box which has a long dimension that extends transversely in a direction that is substantially horizontal and perpendicular to the forward and rearward direction of the watercraft. so that the front wall of the inter-cooler faces a rear side of the engine body.

14. The internal combustion engine for a personal watercraft according to claim 13, wherein an intake manifold, which is operatively connected to intake pipes contiguous to cylinders of the internal combustion engine, is bent rearwardly along a side surface of the engine body and is operatively connected to a throttle body; and
wherein the throttle body is connected to the front wall of the inter-cooler, and
since the inter-cooler is formed substantially in the shape of the rectangular-sided box having the long dimension extending transversely across the watercraft body,
the supercharger is able to be disposed rearwardly of the engine body and directly below the inter-cool.

15. The internal combustion engine for a personal watercraft according to claim 14, wherein the intake manifold bends such that a side external edge of the intake manifold comes closer to a center of the engine body as compared to an external edge of the watercraft at a rear end of the watercraft.

16. The internal combustion engine for the personal watercraft according to claim 13, and further including
an intake manifold operatively connected to a throttle body for connecting said inter-cooler to said intake manifold, and
a fluid inlet passage for introducing a cooling fluid into said inter-cooler and a fluid outlet for discharging the cooling fluid therefrom,
wherein the fluid inlet passage extends transversely and faces a port side of the watercraft body and the fluid outlet passage extends transversely faces the starboard side of the watercraft body.

17. The internal combustion engine for the personal watercraft according to claim 16, wherein said throttle body extends around the rear side of the engine body and is directly connected to the front wall of said inter-cooler for reducing piping therebetween.

18. The internal combustion engine for the personal watercraft according to claim 13, wherein a connection of the intake pipe, the throttle body and the inter-cooler and is smoothly bent from the rear side of the engine body to extend along one side of the engine body.

19. The internal combustion engine for the personal watercraft according to claim 7, and further including a fluid inlet passage for introducing a cooling fluid into said inter-cooler and a fluid outlet for discharging the cooling fluid therefrom, wherein the fluid inlet passage extends transversely and faces a port side of the watercraft body and the fluid outlet passage extends transversely faces the starboard side of the watercraft body.

20. The internal combustion engine for the personal watercraft according to claim 13, and further including a fluid inlet passage for introducing a cooling fluid into said inter-cooler and a fluid outlet for discharging the cooling fluid therefrom, wherein the fluid inlet passage extends transversely and faces a port side of the watercraft body and the fluid outlet passage extends transversely faces the starboard side of the watercraft body.

* * * * *